(12) United States Patent
Koizuka et al.

(10) Patent No.: US 11,851,571 B2
(45) Date of Patent: Dec. 26, 2023

(54) INK SET, INKJET PRINTING APPARATUS, AND INKJET PRINTING METHOD

(71) Applicants: Yuusuke Koizuka, Kanagawa (JP); Naoto Shimura, Tokyo (JP); Nozomi Terai, Tokyo (JP); Tatsuya Takarada, Kanagawa (JP)

(72) Inventors: Yuusuke Koizuka, Kanagawa (JP); Naoto Shimura, Tokyo (JP); Nozomi Terai, Tokyo (JP); Tatsuya Takarada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 316 days.

(21) Appl. No.: 17/482,556

(22) Filed: Sep. 23, 2021

(65) Prior Publication Data

US 2022/0119664 A1    Apr. 21, 2022

(30) Foreign Application Priority Data

Oct. 21, 2020 (JP) ................................ 2020-176543
Jul. 27, 2021 (JP) ................................ 2021-122305

(51) Int. Cl.
*C09D 11/40* (2014.01)
*B41J 2/14* (2006.01)
(Continued)

(52) U.S. Cl.
CPC ............. *C09D 11/40* (2013.01); *B41J 2/1433* (2013.01); *B41M 5/0023* (2013.01);
(Continued)

(58) Field of Classification Search
CPC ....... C09D 11/322; C09D 11/38; C09D 11/40; C09D 11/037; B41J 2/01; B41M 5/0047
See application file for complete search history.

(56) References Cited

U.S. PATENT DOCUMENTS 3,418,302 A    12/1968   Darby
3,978,030 A     8/1976   Resnick
(Continued)

FOREIGN PATENT DOCUMENTS

EP    2778203        9/2014
JP    56-089569      7/1981
(Continued)

OTHER PUBLICATIONS

U.S. Appl. No. 17/422,516, filed Jan. 21, 2020, Hiromi Sakaguchi, et al.
(Continued)

*Primary Examiner* — John Zimmermann
(74) *Attorney, Agent, or Firm* — Grüneberg and Myers PLLC

(57) ABSTRACT

Provided is an ink set including standard ink and light ink. Standard ink includes cyan, magenta, and yellow inks. Light ink includes a light cyan or light magenta ink, or both. The pigment concentration in cyan ink is 1.9% by mass or greater but 3.6% by mass or less. The pigment concentration in light cyan ink is 0.4% by mass or greater but 1.4% by mass or less. The pigment concentration in magenta ink is 1.9% by mass or greater but 3.6% by mass or less. The pigment concentration in light magenta ink is 0.4% by mass or greater but 1.4% by mass or less. The light ink contains water, organic solvent, and resin. The organic solvent contains amide compound represented by General formula (1).

General formula (1)

$$R_1-O-\underset{H_2}{C}-\underset{H_2}{C}-\underset{\|}{\overset{O}{C}}-\underset{\underset{R_3}{|}}{N}-R_2$$

(Continued)

In General formula (1), $R_1$, $R_2$, and $R_3$ each represent a hydrocarbon group containing from 1 through 8 carbon atoms.

8 Claims, 6 Drawing Sheets

(51) Int. Cl.
- *B41M 5/00* (2006.01)
- *C09D 11/033* (2014.01)
- *C09D 11/037* (2014.01)
- *C09D 11/104* (2014.01)
- *C09D 11/322* (2014.01)

(52) U.S. Cl.
CPC .......... *C09D 11/033* (2013.01); *C09D 11/037* (2013.01); *C09D 11/104* (2013.01); *C09D 11/322* (2013.01)

(56) References Cited

U.S. PATENT DOCUMENTS

| | | | |
|---|---|---|---|
| 2014/0002539 A1* | 1/2014 | Goto | C09D 11/322 106/31.75 |
| 2014/0066590 A1* | 3/2014 | Suzuki | C08G 73/101 549/459 |
| 2015/0291817 A1 | 10/2015 | Katoh et al. | |
| 2015/0376425 A1 | 12/2015 | Hakiri et al. | |
| 2016/0130452 A1 | 5/2016 | Katoh et al. | |
| 2016/0222234 A1 | 8/2016 | Matsuyama et al. | |
| 2016/0362572 A1 | 12/2016 | Matsuyama et al. | |
| 2017/0267884 A1 | 9/2017 | Koizuka et al. | |
| 2017/0335123 A1* | 11/2017 | Nakamura | C09D 11/38 |
| 2017/0355187 A1* | 12/2017 | Hashimoto | B41J 2/04586 |
| 2018/0001669 A1* | 1/2018 | Furukawa | C09D 11/40 |
| 2018/0170061 A1 | 6/2018 | Nakamura et al. | |
| 2018/0208783 A1 | 7/2018 | Takahashi et al. | |
| 2018/0346747 A1* | 12/2018 | Habashi | C09D 11/328 |
| 2019/0136076 A1 | 5/2019 | Koizuka et al. | |
| 2019/0270900 A1 | 9/2019 | Nakamura et al. | |
| 2019/0276694 A1 | 9/2019 | Yamazaki et al. | |
| 2019/0283406 A1 | 9/2019 | Fujita et al. | |
| 2020/0016898 A1 | 1/2020 | Sagara et al. | |
| 2020/0102467 A1 | 4/2020 | Nakamura et al. | |
| 2020/0299531 A1 | 9/2020 | Nakamura et al. | |
| 2020/0399496 A1 | 12/2020 | Nonaka et al. | |
| 2021/0062026 A1 | 3/2021 | Shimura et al. | |
| 2021/0155012 A1 | 5/2021 | Gotou et al. | |

FOREIGN PATENT DOCUMENTS

| | | |
|---|---|---|
| JP | 63-238111 | 10/1988 |
| JP | 63-238115 | 10/1988 |
| JP | 1-131214 | 5/1989 |
| JP | 1-131215 | 5/1989 |
| JP | 6-210857 | 8/1994 |
| JP | 10-032984 | 2/1998 |
| JP | 2000-094567 | 4/2000 |
| JP | 2002-145645 | 5/2002 |
| JP | 2002-332440 | 11/2002 |
| JP | 2003-112469 | 4/2003 |
| JP | 2003-341070 | 12/2003 |
| JP | 2007-106024 | 4/2007 |
| JP | 2007-125849 | 5/2007 |
| JP | 2012067159 | 4/2012 |
| WO | 2012/018098 | 2/2012 |

OTHER PUBLICATIONS

U.S. Appl. No. 17/315,362, filed May 10, 2021, Mio Akima, et al.
Extended European Search Report dated Mar. 21, 2022 in European Application No. 21200346.1, 5 pages.

* cited by examiner

INK SET, INKJET PRINTING APPARATUS, AND INKJET PRINTING METHOD

CROSS-REFERENCE TO RELATED APPLICATIONS

This patent application is based on and claims priority pursuant to 35 U.S.C. § 119(a) to Japanese Patent Application Nos. 2020-176543 and 2021-122305, filed on Oct. 21, 2020 and Jul. 27, 2021, respectively, in the Japan Patent Office, the entire disclosure of each of which is hereby incorporated by reference herein.

BACKGROUND

Technical Field

The present disclosure relates to an ink set, an inkjet printing apparatus, and an inkjet printing method.

Description of the Related Art

Inkjet recording methods have simpler processes and higher adaptability to full-color operations, and can form higher-resolution images with simpler device configurations than other recording methods. Therefore, inkjet recording methods are becoming spread from personal and office uses to industrial printing fields.

In industrial printing, particularly in sign graphic fields, a high color developability is demanded on printed matters. On the other hand, when inks having a high pigment concentration and a good color developability are used, there is a problem that an undesirable graininess occurs at a highlighted low-bit portion.

SUMMARY

According to an aspect of the present disclosure, an ink set includes a standard ink and a light ink. The standard ink includes at least a cyan ink, a magenta ink, and a yellow ink. The light ink includes a light cyan ink or a light magenta ink, or both. The content of a cyan pigment in the cyan ink is 1.9% by mass or greater but 3.6% by mass or less. The content of a cyan pigment in the light cyan ink is 0.4% by mass or greater but 1.4% by mass or less. The content of a magenta pigment in the magenta ink is 1.9% by mass or greater but 3.6% by mass or less. The content of a magenta pigment in the light magenta ink is 0.4% by mass or greater but 1.4% by mass or less. The light ink contains water, an organic solvent, and a resin. The organic solvent contains an amide compound represented by General formula (1) below.

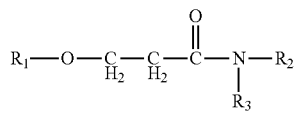

General formula (1)

In the General formula (1), $R_1$, $R_2$, and $R_3$ each independently represent a hydrocarbon group containing from 1 through 8 carbon atoms.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
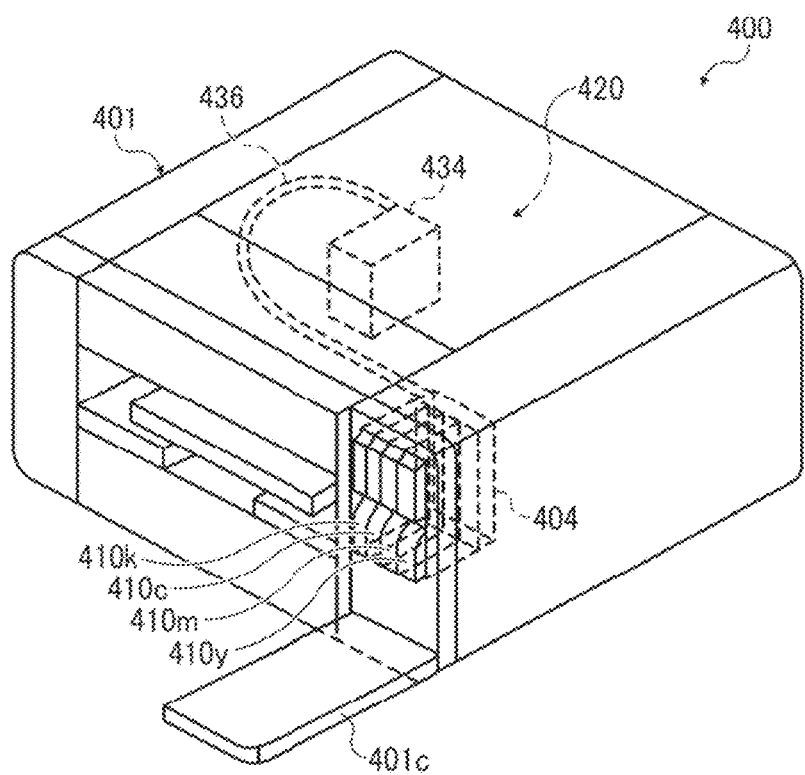
FIG. 1 is a view illustrating an image forming apparatus that performs an image forming method of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The present disclosure can provide a well-fixable ink set that can suppress graininess of a highlighted portion even when inks having a high pigment concentration and a good color developability are used.

(Ink Set)

An ink set of the present disclosure includes a standard ink and a light ink. The standard ink includes at least a cyan ink, a magenta ink, and a yellow ink. The light ink includes a light cyan ink or a light magenta ink, or both. The content of a cyan pigment in the cyan ink is 1.9% by mass or greater but 3.6% by mass or less. The content of a cyan pigment in the light cyan ink is 0.4% by mass or greater but 1.4% by mass or less. The content of a magenta pigment in the magenta ink is 1.9% by mass or greater but 3.6% by mass or less. The content of a magenta pigment in the light magenta ink is 0.4% by mass or greater but 1.4% by mass or less. The light ink contains water, an organic solvent, and a resin. The organic solvent contains an amide compound represented by General formula (1) below.

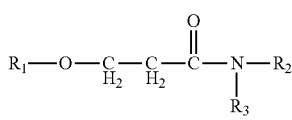

General formula (1)

In the General formula (1), $R_1$, $R_2$, and $R_3$ each independently represent a hydrocarbon group containing from 1 through 8 carbon atoms.

When expressing the same highlighted portion using standard inks and light inks, the amount of the light inks to be attached is greater than the amount of the standard inks to be attached. Therefore, the problem of existing techniques when expressing a highlighted portion with light inks is degradation of fixability due to drying failure.

The highlighted portion has a relatively low saturation and a relatively low brightness. The pigment concentration in light inks is lower than the pigment concentration in standard inks. When printing standard inks and light inks at the same saturation and the same brightness, it is necessary to attach light inks in greater amounts than standard inks.

In the present disclosure, the light inks contain water, an organic solvent, and a resin, and the organic solvent contains an amide compound represented by General formula (1) above. This makes it possible to promote film formation of the resin and improve fixability, and suppress graininess of a highlighted portion even when standard inks and light inks are used in combination.

Moreover, existing techniques fail to optimize the receding contact angle of inks on a nozzle plate of a discharging head and have a problem that the inks easily wet an ink-repelling film of the nozzle plate of the discharging head and adhere to the nozzles, to have a low discharging stability.

In the present disclosure, each ink of the ink set has a receding contact angle of 35 degrees or greater on a nozzle plate of a discharging head and does not easily wet an ink-repelling film of the nozzle plate of the discharging head. Therefore, even when the ink adheres to an internal wall surface of an ink chamber of the discharging head, the ink can be easily repelled back and has a good discharging stability. This increases the ink droplet landing accuracy and better suppresses graininess of a highlighted portion.

The ink set of the present disclosure includes a standard ink and s light ink.

The standard ink includes at least a cyan ink, a magenta ink, and a yellow ink, and preferably includes a black ink. Each standard ink contains a pigment in a standard amount.

The light ink includes alight cyan ink or alight magenta ink, or both. Each light ink contains a pigment in a lower amount than the standard ink.

The content of a cyan pigment in the cyan ink is 1.9% by mass or greater but 3.6% by mass or less, preferably 2.1% by mass or greater but 3.5% by mass or less, and yet more preferably 2.4% by mass or greater but 3.0% by mass or less. When the content of a cyan pigment in the cyan ink is 1.9% by mass or greater but 3.6% by mass or less, a high color developability can be obtained.

The content of a cyan pigment in the light cyan ink is 0.4% by mass or greater but 1.4% by mass or less, preferably 0.6% by mass or greater but 1.1% by mass or less, and yet more preferably 0.6% by mass or greater but 0.9% by mass or less.

The content of a magenta pigment in the magenta ink is 1.9% by mass or greater but 3.6% by mass or less, preferably 2.1% by mass or greater but 3.5% by mass or less, and more preferably 2.4% by mass or greater but 3.0% by mass or less. When the content of a magenta pigment in the magenta ink is 1.9% or greater but 3.6% by mass or less, a high color developability can be obtained.

The content of a magenta pigment in the light magenta ink is 0.4% by mass or greater but 1.4% by mass or less, preferably 0.6% by mass or greater but 1.1% by mass or less, and more preferably 0.7% by mass or greater but 1.1% by mass or less.

<Light Ink>

The light ink contains water, an organic solvent, and a resin, preferably contains a surfactant, and further contains other components as needed.

The light ink includes a light cyan ink containing a cyan pigment or a light magenta ink containing a magenta pigment, or both of the light cyan ink and the light magenta ink.

The cyan pigment is not particularly limited and may be appropriately selected depending on the intended purpose. Examples of the cyan pigment include, but are not limited to, C.I. Pigment Blue 1, 2, 15 (phthalocyanine blue), 15:1, 15:2, 15:3, 15:4 (phthalocyanine blue), 16, 17:1, 56, 60, and 63. One of these cyan pigments may be used alone or two or more of these cyan pigments may be used in combination.

The magenta pigment is not particularly limited and may be appropriately selected depending on the intended purpose. Examples of the magenta pigment include, but are not limited to, C.I. Pigment Red 1, 2, 3, 5, 17, 22, 23, 31, 38, 48:2 (permanent red 2B(Ca)), 48:3, 48:4, 49:1, 52:2, 53:1, 57:1 (brilliant carmine 6B), 60:1, 63:1, 63:2, 64:1, 81, 83, 88, 101 (rouge), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, and 264. One of these magenta pigments may be used alone or two or more of these magenta pigments may be used in combination.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily wholly coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<<Pigment Dispersion>>

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density.

The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the content is preferably from 0.1 to 50 percent by mass and more preferably from 0.1 to 30 percent by mass.

During the production, coarse particles are optionally filtered off from the pigment dispersion with a filter, a centrifuge, etc. preferably followed by degassing.

<<Organic Solvent>>

The organic solvent is not particularly limited. Water-soluble organic solvents can be used. Examples of water-soluble organic solvents include, but are not limited to, polyvalent alcohols, ethers such as polyvalent alcohol alkyl ethers and polyvalent alcohol aryl ethers, nitrogen-containing heterocyclic compounds, amide compounds, amines, and sulfur-containing compounds.

Examples of the water-soluble organic solvents include, but are not limited to, polyvalent alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amide compounds represented by General formula (1) below; amines such as monoethanol amine, diethanol amine, and triethyl amine; sulfur-containing compounds such as dimethyl sulfoxide, sulfolane, and thio diethanol; and propylene carbonate and ethylene carbonate.

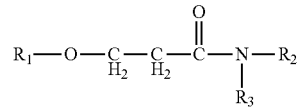

General formula (1)

In the General formula (1), $R_1$, $R_2$, and $R_3$ each independently represent a hydrocarbon group containing 1 or more but 8 or less carbon atoms.

Among these organic solvents, amide compounds represented by General formula (1) are preferable in terms of promoting film formation of a resin and improving fixability.

The hydrocarbon group is not particularly limited so long as the number of carbon atoms is 1 or more but 8 or less. Examples of the hydrocarbon group include, but are not limited to, straight-chain or branched, or cyclic alkyl groups.

Examples of the alkyl groups include, but are not limited to, a methyl group, an ethyl group, a propyl group, a butyl group, an isopropyl group, an isobutyl group, a pentyl group, a hexyl group, a heptyl group, an ethylhexyl group, an octyl group, a cyclopropyl group, a cyclobutyl group, a cyclopentyl group, and a cyclohexyl group.

Examples of the amide group represented by General formula (1) include, but are not limited to, 3-methoxy-N,N-dimethylpropane amide and 3-butoxy-N,N-dimethylpropane amide.

The content of the amide compound represented by General formula (1) is preferably 5% by mass or greater but 20% by mass or less relative to the total amount of the light ink.

Polyol compounds having eight or more carbon atoms and glycol ether compounds are also suitable.

Specific examples of the polyol compounds having eight or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

The polyol compounds having eight or more carbon atoms and glycol ether compounds enhance the permeability of ink when paper is used as a print medium.

The proportion of the organic solvent in the light ink has no particular limit and can be suitably selected to suit a particular application.

In terms of the drying property and discharging reliability of the ink, the proportion is preferably from 10 to 60 percent by mass and more preferably from 20 to 60 percent by mass.

<<Water>>

The water is not particularly limited and may be appropriately selected depending on the intended purpose. Examples of the water include, but are not limited to, pure water such as ion-exchanged water, ultrafiltrated water, reverse osmotic water, and distilled water; and ultrapure water. One of these kinds of water may be used alone or two or more of these kinds of water may be used in combination.

The proportion of water in the light ink has no particular limit and can be suitably selected to suit to a particular application. In terms of the drying property and discharging reliability of the ink, the proportion is preferably from 10 to 90 percent by mass and more preferably from 20 to 60 percent by mass.

<<Resin>>

The type of the resin has no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins. Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. It is possible to synthesize the resin particle or obtain from market. These can be used alone or in combination of the resin particles.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total content of the ink.

The particle diameter of the solid portion in the light ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

<<Surfactant>>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of poly oxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxy ethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants have no particular limit and can be suitably selected to suit to a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market is suitable. Products available on the market are obtained from Byk Chemie Japan Co., Ltd., Shin-Etsu Chemical Co., Ltd., Dow Corning Toray Silicone Co., Ltd., NIHON EMULSION Co., Ltd., Kyoeisha Chemical Co., Ltd., etc.

The polyether-modified silicone-containing surfactant has no particular limit and can be suitably selected to suit to a particular application. Examples thereof include, but are not limited to, a compound in which the polyalkylene oxide structure represented by the following General formula S-1 is introduced into the side chain of the Si site of dimethyl polysiloxane.

General formula S-1

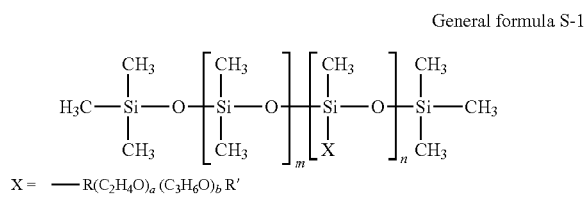

$X = —R(C_2H_4O)_a(C_3H_6O)_bR'$

In the General formula S-1, "m", "n", "a", and "b" each, respectively represent integers, R represents an alkylene group, and R' represents an alkyl group.

Products available on the market may be used as the polyether-modified silicone-based surfactants. Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105. FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan KK.), and TSF4440, TSF4452, and TSF4453 (all manufactured by Toshiba Silicone Co., Ltd.).

A fluorosurfactant in which the number of carbon atoms replaced with fluorine atoms is from 2 to 16 and more preferably from 4 to 16 is preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following General formula F-1 or General formula F-2 is more preferable.

$CF_3CF_2(CF_2CF_2)_m$—$CH_2CH_2O(CH_2CH_2O)_nH$  General formula F-1

In the General formula F-1, "m" is preferably 0 or an integer of from 1 to 10 and "n" is preferably 0 or an integer of from 1 to 40 in order to provide water solubility.

$C_nF_{2n+1}$—$CH_2CH(OH)CH_2$—O—$(CH_2CH_2O)_a$—Y  General formula F-2

In the General formula F-2, Y represents H, $C_mF_{2m+1}$, where "m" is an integer of from 1 to 6, $CH_2CH(OH)CH_2$-$C_mF_{2m+1}$, where m represents an integer of from 4 to 6, or $C_pH_{2p+1}$, where p represents an integer of from 1 to 19. "n" represents an integer of from 1 to 6, a" represents an integer of from 4 to 14.

Products available on the market may be used as the fluorosurfactant. Specific examples of the products available on the market include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFAC F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES). Of these, FS-3100, FS-34, and FS-300 (all manufactured by The Chemours Company), FT-110, FT-250, FT-251, FT-400S, FT-150, and FT-400SW (all manufactured by NEOS COMPANY LIMITED), POLYFOX PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dyeing property to paper.

The proportion of the surfactant in ink is not particularly limited and can be suitably selected to suit to a particular application. It is preferably from 0.01 to 5 percent by mass and more preferably from 0.05 to 5 percent by mass of the total amount of the light ink in terms of excellent wettability and improvement on image quality.

The light inks may contain, for example, a defoaming agent, a preservative and a fungicide, a corrosion inhibitor, and a pH regulator as other components.

—Defoaming Agent—

The defoaming agent has no particular limit. For example, silicone-based defoaming agents, polyether-based defoaming agents, and aliphatic acid ester-based defoaming agents are suitable. These can be used alone or in combination. Of these, silicone-based defoaming agents are preferable to easily break foams.

—Preservatives and Fungicides—

The preservatives and fungicides are not particularly limited. A specific example is 1,2-benzisothiazolin-3-on.

—Corrosion Inhibitor—

The corrosion inhibitor has no particular limit. Examples thereof are acid sulfite, sodium thiosulfate, and 1,2,3-benzotriazole.

—pH Regulator—

The pH regulator has no particular limit. It is preferable to adjust the pH to 7 or higher. Specific examples thereof include, but are not limited to, amines such as diethanol amine and triethanol amine, and 2-amino-2-ethyl-1,3-propanediol.

The property of the light inks is not particularly limited and can be suitably selected to suit to a particular application. For example, viscosity, surface tension, pH, etc., are preferably in the following ranges.

The viscosity of the light inks at 25 degrees C. is preferably from 5 to 30 mPa·s and more preferably from 5 to 25 mPa-s to improve print density and text quality and obtain good dischargibility.

The viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the light ink is preferably 35 mN/m or less and more preferably 32 mN/m or less at 25 degrees C. in terms that the ink is suitably levelized on a print medium and the drying time of the ink is shortened.

The pH of the light ink is preferably from 7 to 12 and more preferably from 8 to 11 in terms of prevention of corrosion of metal materials contacting the ink.

<Standard Ink>

The standard ink contains a coloring material, water, an organic solvent, and a resin, preferably contains a surfactant, and further contains other components as needed.

<<Coloring Material>>

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The type of dye is not particularly limited and includes, for example, acidic dyes, direct dyes, reactive dyes, and basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The standard ink includes at least a cyan ink, a magenta ink, and a yellow ink, and preferably includes a black ink.

The content of a cyan pigment in the cyan ink is 1.9% by mass or greater but 3.6% by mass or less and preferably 2.4% by mass or greater but 3.0% by mass or less.

The content of a magenta pigment in the magenta ink is 1.9% by mass or greater but 3.6% by mass or less and preferably 2.4% by mass or greater but 3.0% by mass or less.

The content of a yellow pigment in the yellow ink is preferably 1.9% by mass or greater but 3.6% by mass or less.

The content of a black pigment in the black ink is preferably 1.9% by mass or greater but 3.6% by mass or less.

The water, the organic solvent, the resin, the surfactant, and the other components of the standard inks are the same as the water, the organic solvent, the resin, the surfactant, and the other components of the light inks. Therefore, description of these components will be skipped.

<Print Medium>

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate, and board substrates of polystyrene, acrylic, polypropylene, aluminum composite materials, and polycarbonate are suitably used for the non-permeating substrate.

<Printing Apparatus and Printing Method>

In the following description of a printing apparatus and a printing method, a case of using a black (K) ink, a cyan (C) ink, a magenta (M) ink, and a yellow (Y) ink will be described. However, it is optional to use a light ink such as a light cyan ink or a light magenta ink in addition to these inks.

Each ink of the ink set used in the present disclosure can be suitably applied to various printing apparatuses employing an inkjet printing method such as printers, facsimile machines, photocopiers, multifunction peripherals (serving as a printer, a facsimile machine, and a photocopier), and 3D model manufacturing devices (3D printers, additive manufacturing device).

In addition, the inkjet printing apparatus includes both a serial type apparatus in which the liquid discharging head is caused to move and a line type apparatus in which the liquid discharging head is not moved, unless otherwise specified.

Furthermore, in addition to the desktop type, this inkjet printing apparatus includes a wide type and a continuous printer capable of using continuous paper wound up in a roll form as print media.

In the present disclosure, the printing apparatus and the printing method represent an apparatus capable of discharging ink, various processing fluids, etc. to a print medium and a method printing an image on the print medium using the apparatus. The print medium means an article to which the ink or the various processing fluids can be attached at least temporarily.

The printing apparatus may further optionally include a device relating to feeding, conveying, and ejecting the print medium and other devices referred to as a pre-processing device, a post-processing device, etc. in addition to the head portion to discharge the ink.

In addition, the printing apparatus and the printing method are not limited to those producing merely meaningful visible images such as texts and figures with the ink. For example, the printing apparatus and the printing method can produce patterns like geometric design and 3D images.

In addition, the printing apparatus includes both a serial type apparatus in which the liquid discharging head is caused to move and a line type apparatus in which the liquid discharging head is not moved, unless otherwise specified.

Furthermore, in addition to the desktop type, this printing apparatus includes a wide type capable of printing images on a large print medium such as AO, a continuous printer capable of using continuous paper wound up in a roll form as print media.

Figure 2:
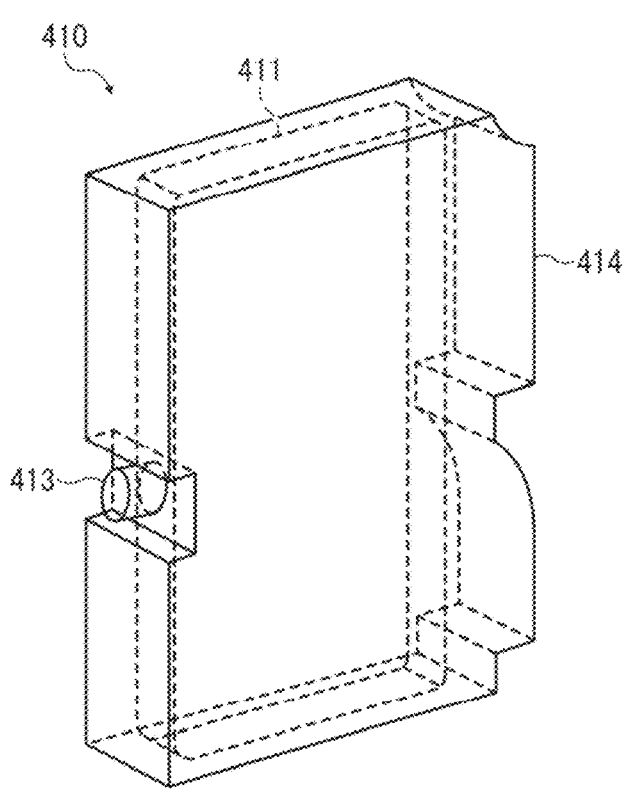
FIG. 2 is a perspective view illustrating a main tank of the image forming apparatus of FIG. 1.

The printing apparatus of the present disclosure is described using an example with reference to FIG. 1 and FIG. 2. FIG. 1 is a perspective view illustrating the image printing apparatus. FIG. 2 is a perspective view illustrating the main tank. An image forming apparatus 400 as an example of the printing apparatus is a serial type image forming apparatus. A mechanical unit 420 is disposed in an exterior 401 of the image forming apparatus 400. Each ink accommodating unit 411 of each main tank 410 (410k, 410c, 410m, and 410y) for each color of black (K), cyan (C), magenta (M), and yellow (Y) is made of a packing member such as aluminum laminate film. The ink accommodating unit 411 is accommodated in a plastic housing unit 414. As a result, the main tank 410 is used as an ink cartridge of each color.

A cartridge holder 404 is disposed on the rear side of the opening when a cover 401c of the main body is opened. The cartridge holder 404 is detachably attached to the main tank 410. As a result, in the image forming apparatus 400, each ink discharging outlet 413 of the main tank 410 is communicated with a discharging head 434 for each color via a supplying tube 436 for each color so that the ink can be discharged from the discharging head 434 to a print medium.

This printing apparatus may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known apparatus with no particular limit. For example, the apparatus includes an ink storing unit, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable as a product of molding performed after surface-decoration. Examples thereof are gauges or operation panels of vehicles, office machines, electric and electronic machines, cameras, etc.

The inkjet printing apparatus of the present disclosure includes ink accommodating units storing the inks of the ink set of the present disclosure and discharging heads configured to discharge the inks of the ink set, and further includes other members as needed.

The receding contact angle of each ink of the ink set on a nozzle plate of the discharging head is 35 degrees or greater, preferably 35 degrees or greater but 80 degrees or less and more preferably 40 degrees or greater but 70 degrees or less.

When the receding contact angle is 35 degrees or greater, even if each ink of the ink set adheres to an internal wall surface of an ink chamber of the discharging head, the ink can be easily repelled back. The upper limit of the receding contact angle is not particularly limited in terms of wettability because a greater receding contact angle ensures a greater anti-wettability, but is preferably not greater than 80 degrees (80 degrees or less) when, for example, permeability into a print medium is taken into consideration.

The receding contact angle can be measured by, for example, an extension or contraction method of an automatic contact angle meter. Examples of the automatic contact angle meter include, but are not limited to, an automatic contact angle meter DMO-501 (available from Kyowa Interface Science Co., Ltd.).

The receding contact angle can be measured with the meter by the contraction method, when each ink (3 microliters) is pushed out onto the external surface of the nozzle plate used in the present disclosure. The receding contact angle of the present disclosure means a value at a measuring temperature of 25 degrees C.

<Ink Accommodating Unit>

The ink accommodating unit stores each ink of the ink set of the present disclosure.

The ink accommodating unit is not particularly limited so long as the ink accommodating unit is a member that can store an ink. Examples of the ink accommodating unit include, but are not limited to, an ink storing container and an ink tank.

The ink storing container stores the ink in a container and further includes other members appropriately selected as needed.

The container is not particularly limited. For example, the shape, structure, size, and material of the container may be appropriately selected. Examples of the container include, but are not limited to, containers including at least an ink bag formed of, for example, aluminum laminate film or resin film.

Examples of the ink tank include, but are not limited to, a main tank and a sub tank.

Next, the discharging head used in the inkjet printing apparatus of the present disclosure will be described.

<Discharging Head>

The discharging head includes a nozzle plate and further includes other members as needed.

—Nozzle Plate—

The nozzle plate includes a nozzle substrate, and an ink-repelling film on the nozzle substrate.

—Nozzle Substrate—

The nozzle substrate includes nozzle holes. For example, the number, shape, size, material, and structure of the nozzle holes are not particularly limited and may be appropriately selected depending on the intended purpose.

The nozzle substrate has an ink discharging-side surface positioned at a side to which an ink is discharged through the nozzle holes, and a liquid chamber-joined surface positioned at a side opposite to the ink discharging-side surface.

The ink-repelling film is formed on the ink discharging-side surface of the nozzle plate, i.e., a surface facing a print medium. The receding contact angle of each ink on the surface facing a print medium is 35 degrees or greater.

The planar shape of the nozzle substrate is not particularly limited and may be appropriately selected depending on the intended purpose. Examples of the planar shape of the nozzle substrate include, but are not limited to, a rectangular shape, a square shape, a rhomboidal shape, a circular shape, and an elliptical shape.

Examples of the cross-sectional shape of the nozzle substrate include a flat panel shape and a plate shape.

The size of the nozzle substrate is not particularly limited and may be appropriately selected depending on the size of the nozzle plate.

The material of the nozzle substrate is not particularly limited and may be appropriately selected depending on the intended purpose. Examples of the material of the nozzle substrate include, but are not limited to, stainless steel, Al, Bi, Cr, InSn, ITO, Nb, $Nb_2O_5$, NiCr, Si, $SiO_2$, Sn, $Ta_2O_5$, Ti, W, ZAO($ZnO+Al_2O_3$), and Zn. One of these materials may be used alone or two or more of these materials may be used in combination. Among these materials, stainless steel is preferable as the material of the nozzle substrate in terms of a corrosion inhibiting property.

The stainless steel is not particularly limited and may be appropriately selected depending on the intended purpose. Examples of the stainless steel include, but are not limited to, austenitic stainless steels, ferritic stainless steels, martensitic stainless steels, and precipitation hardening stainless steels. One of these stainless steels may be used alone or two or more of these stainless steels may be used in combination.

It is optional to apply oxygen plasma treatment and introduce a hydroxyl group into at least the ink discharging-side surface of the nozzle substrate in terms of improving adhesiveness between the ink-repelling film and the nozzle substrate.

—Nozzle Holes—

The number, arrangement, interval, opening shape, opening size, and opening's cross-sectional shape of the nozzle holes are not particularly limited and may be appropriately selected depending on the intended purpose.

The arrangement of the nozzle holes is not particularly limited and may be appropriately selected depending on the intended purpose. Examples of the arrangement of the nozzle holes include, but are not limited to, an arrangement of a plurality of nozzle holes at regular intervals along a longer direction of the nozzle substrate.

The arrangement of the nozzle holes may be appropriately selected depending on the kind of the ink to be discharged. The number of lines along which the nozzle holes are arranged is preferably from one through a plurality of lines and more preferably from one through four lines.

The number of the nozzle holes per line is not particularly limited, may be appropriately selected depending on the intended purpose, and is preferably 10 or greater but 10,000 or less and more preferably 50 or greater but 500 or less.

The interval (pitch) P, which is the minimum distance between the centers of adjoining nozzle holes, is not particularly limited, may be appropriately selected depending on the intended purpose, and is preferably 21 micrometers or greater but 169 micrometers or less.

The opening shape of the nozzle holes is not particularly limited and may be appropriately selected depending on the intended purpose. Examples of the opening shape of the nozzle holes include, but are not limited to, a circular shape, an elliptical shape, and a quadrangular shape. Among these shapes, a circular shape is preferable as the opening shape of the nozzle holes in terms of discharging a liquid droplet of an ink.

Figure 9:
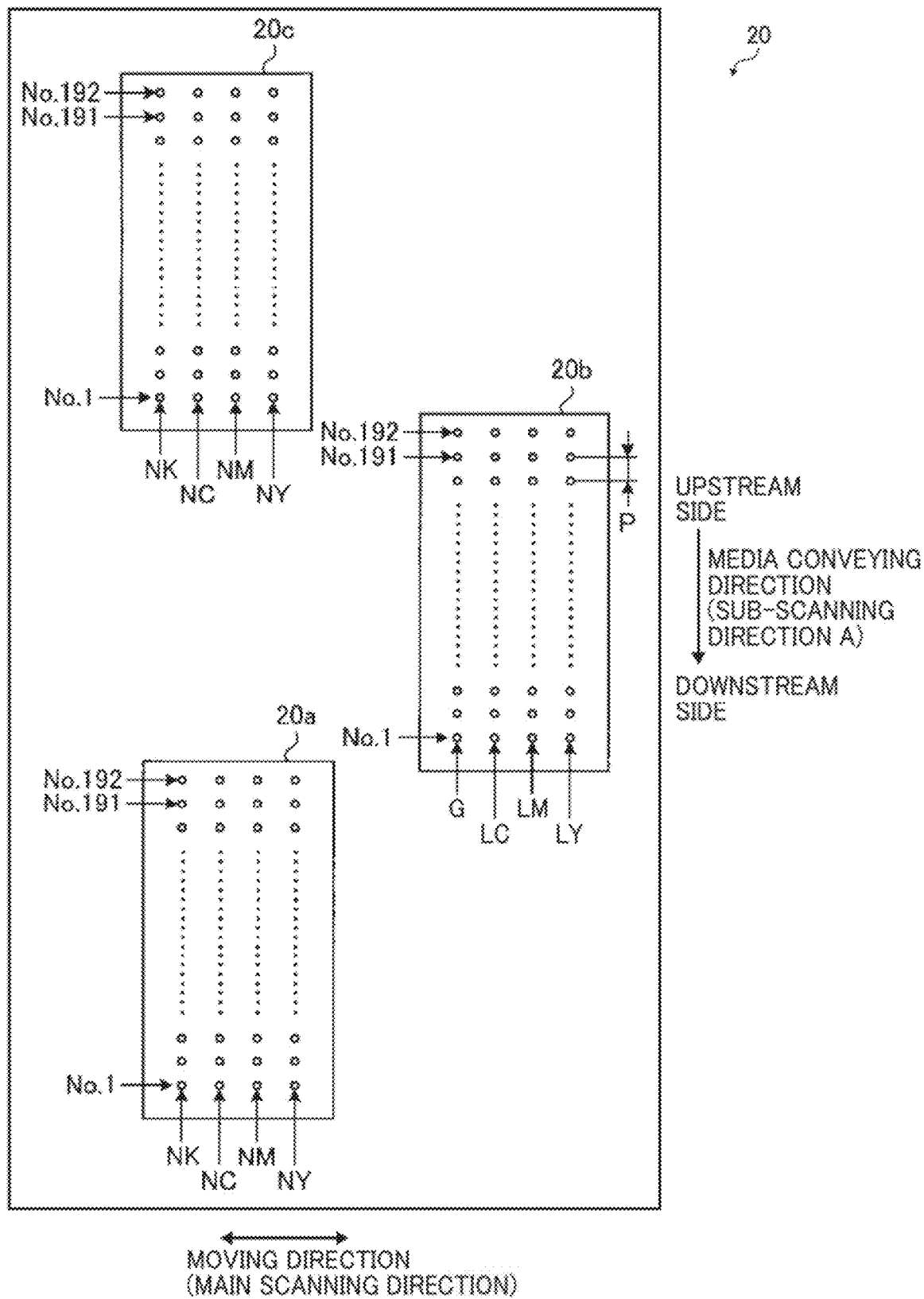
FIG. 9 is a plan view illustrating a nozzle configuration of a recording head.

FIG. 9 is a plan view illustrating the nozzle configuration of a recording head 20. FIG. 9 illustrates the nozzle lines of the recording head 20 from above in a see-through manner. As illustrated in FIG. 9, the recording head 20 includes a first nozzle group 20a, a second nozzle group 20b, and a third nozzle group 20c.

As illustrated in FIG. 9, the nozzle groups 20a, 20b, and 20c are arranged in two lines extending orthogonally to the main scanning direction, and are staggered in the sub-scanning direction. That is, the nozzle groups 20a, 20b, and 20c are arranged in the order of the third nozzle group 20c, the second nozzle group 20b, and the first nozzle group 20a from the upstream side to the downstream side in the conveying direction A of a recording medium 40 in a manner that the nozzle lines do not overlap. As illustrated in FIG. 9, the second nozzle group 20b is arranged out of accordance from the first nozzle group 20a and the third nozzle group 20c in the main scanning direction.

The first nozzle group 20a and the third the nozzle group 20c each include one nozzle line for discharging ink droplets of an auxiliary ink (or an ink for background or an ink for foundation) and three nozzle lines for discharging CMY (process color) ink droplets for image formation. Each nozzle line includes 192 nozzle holes from a nozzle hole of nozzle No. 1 to a nozzle hole of nozzle No. 192. In the example illustrated in FIG. 9, these nozzle holes are given nozzle No. 1 to nozzle No. 192 in the order of downstream nozzle holes to upstream nozzle holes in the conveying direction A of a recording medium 40. The pitch P between these nozzle holes is 150 dpi (dots per inch).

As illustrated in FIG. 9, the first nozzle group 20a and the third nozzle group 20c each include a cyan ink nozzle line NC for discharging cyan (C) ink droplets, a magenta ink nozzle line NM for discharging magenta (M) ink droplets, a yellow ink nozzle line NY for discharging yellow (Y) ink droplets, and a black ink nozzle line NK for discharging black (K) ink droplets. The second nozzle group 20b includes a gray ink nozzle line G for discharging gray (G) ink droplets, a light cyan ink nozzle line LC for discharging light cyan (LC) ink droplets, a light magenta ink nozzle line LM for discharging light magenta (LM) ink droplets, and a light yellow ink nozzle line LY for discharging light yellow (LY) ink droplets.

Like the first nozzle group 20a, the second nozzle group 20b includes four nozzle lines each including 192 nozzle holes given nozzle No. 1 to nozzle No. 192. Like the first nozzle group 20a, the second nozzle group 20b has a pitch P of 150 dpi between the nozzle holes.

As described above, the nozzle groups 20a, 20b, and 20c include the same number of nozzle lines and the same number of nozzles. Therefore, the nozzle groups 20a, 20b, and 20c can be formed of the same parts. This makes it possible to reduce the number of kinds of parts and save costs of the apparatus.

As illustrated in FIG. 9, it is optional to discharge standard inks and light inks using the nozzle groups 20a, 20b, and 20c.

—Ink-Repelling Film—

It is preferable that the ink-repelling film contain a fluorine-containing acrylate ester polymer or a polymer having a fluorine-containing heterocyclic structure in the main chain thereof.

When the ink-repelling film contains the fluorine-containing acrylate ester polymer or the polymer having a fluorine-containing heterocyclic structure in the main chain thereof, there is an advantage that the ink-repelling film has a very low surface free energy and it is easy for the low-surface-tension ink used in the present disclosure to maintain an anti-wetting state on the ink-repelling film.

However, when other materials than the fluorine-containing acrylate ester polymer or the polymer having a fluorine-containing heterocyclic structure in the main chain thereof is used in the ink-repelling film, the ink-repelling film has a very high surface free energy and the ink used in the present disclosure and having a low surface tension may wet the ink-repelling film.

—Fluorine-Containing Acrylate Ester Polymer—

It is preferable that the fluorine-containing acrylate ester polymer contain either or both of a compound represented by General formula (I) below and a compound represented by General formula (II) below as a monomer unit.

General formula (I)

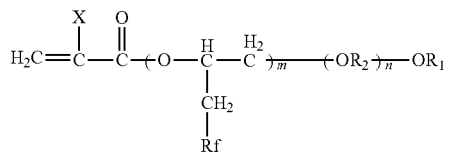

General formula (II)

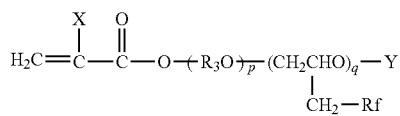

In the General formulae (I) and (II), X represents a hydrogen atom, a straight-chain or branched alkyl group containing from 1 through 21 carbon atoms, a halogen atom, a $CFX_1X_2$ group where $X_1$ and $X_2$ each independently represent a hydrogen atom or a halogen atom, a cyano group, a straight-chain or branched fluoroalkyl group containing from 1 through 21 carbon atoms, a substituted or unsubstituted benzyl group, or a substituted or unsubstituted phenyl group, $R_1$ represents an alkyl group containing from 1 through 18 carbon atoms, $R_2$ represents an alkylene group containing from 2 through 6 carbon atoms, $R_3$ represents an alkylene group containing from 2 through 6 carbon atoms, Y represents an acid radical, Rf represents a straight-chain or branched fluoroalkyl group containing from 1 through 21 carbon atoms, m is from 1 through 10, n is from 2 through 90, p is from 1 through 90, and q is from 1 through 10.

A polymer obtained by polymerizing either or both of the compound represented by the General formula (I) and the compound represented by the General formula (II) is a polymer containing either or both of a structural unit represented by General formula (III) below and a structural unit represented by General formula (IV) below.

General formula (III)

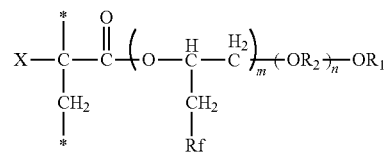

General formula (IV)

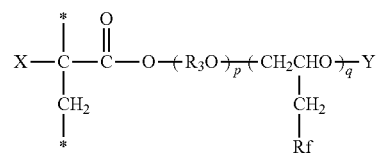

In the General formulae (III) and (IV), X represents a hydrogen atom, a straight-chain or branched alkyl group containing from 1 through 21 carbon atoms, a halogen atom, a $CFX_1X_2$ group where $X_1$ and $X_2$ each independently represent a hydrogen atom or a halogen atom, a cyano group, a straight-chain or branched fluoroalkyl group containing from 1 through 21 carbon atoms, a substituted or unsubstituted benzyl group, or a substituted or unsubstituted phenyl group, $R_1$ represents an alkyl group containing from 1 through 18 carbon atoms, $R_2$ represents an alkylene group containing from 2 through 6 carbon atoms, $R_3$ represents an alkylene group containing from 2 through 6 carbon atoms, Y represents an acid radical, Rf represents a straight-chain or branched fluoroalkyl group containing from 1 through 21 carbon atoms, m is from 1 through 10, n is from 2 through 90, p is from 1 through 90, and q is from 1 through 10.

$R_1$ contains preferably from 1 through 18 carbon atoms, and more preferably from 1 through 4 carbon atoms. Examples of $R_1$ include, but are not limited to, a methyl group, an ethyl group, a propyl group, a butyl group, a pentyl group, a hexyl group, a heptyl group, an octyl group, a nonyl group, a decyl group, and an undecyl group.

$R_2$ is an alkylene group containing from 2 through 6 carbon atoms. Examples of $R_2$ include, but are not limited to, an ethylene group, a propylene group, and a butylene group. Among these groups, $R_2$ is preferably an ethylene group.

$R_3$ is an alkylene group containing from 2 through 6 carbon atoms. Examples of $R_3$ include, but are not limited to, an ethylene group, a propylene group, and a butylene group. Among these groups, $R_3$ is preferably an ethylene group.

Y is an acid radical. Examples of Y include, but are not limited to, a sulfonic acid group, a succinic acid group, an acetic acid group, a phthalic acid group, a hydrogenated phthalic acid group, and a maleic acid group.

Rf is a straight-chain or branched fluoroalkyl group containing from 1 through 21 carbon atoms, and is preferably a perfluoroalkyl group. Rf contains preferably from 1 through 10 carbon atoms.

Example of Rf include, but are not limited to, $-CF_3$, $-CF_2CF_3$, $-CF_2CF_2CF_3$, $-CF(CF_3)_2$, $-CF_2CF_2CF_2CF_3$, $-CF_2CF(CF_3)_2$, $-C(CF_3)_3$, $-(CF_2)_4CF_3$, $-(CF_2)_2CF(CF_3)_2$, $CF_2C(CF_3)_3$, $-CF(CF)CF_2CF_2CF_3$, $-(CF_2)_5CF_3$, $-(CF_2)_3CF(CF_3)_2$, $-(CF_2)_4CF(CF_3)_2$, $(CF_2)_7CF_3$, $-(CF_2)_5CF(CF_3)_2$, $-(CF_2)_6CF(CF_3)_2$, and $-(CF_2)_9CF_3$.

m is preferably from 1 through 10 and more preferably from 1 through 3.

n is preferably from 2 through 90, more preferably from 3 through 50, and yet more preferably from 4 through 30.

p is preferably from 1 through 90 and more preferably from 1 through 30.

q is preferably from 1 through 10 and more preferably from 1 through 3.

An appropriately synthesized product or a commercially available product may be used as the fluorine-containing acrylate ester polymer.

The fluorine-containing acrylate ester polymer represented by the General formula (II) (where Rf is $C_6F_{13}$) can be synthesized according to, for example, a reaction formula below.

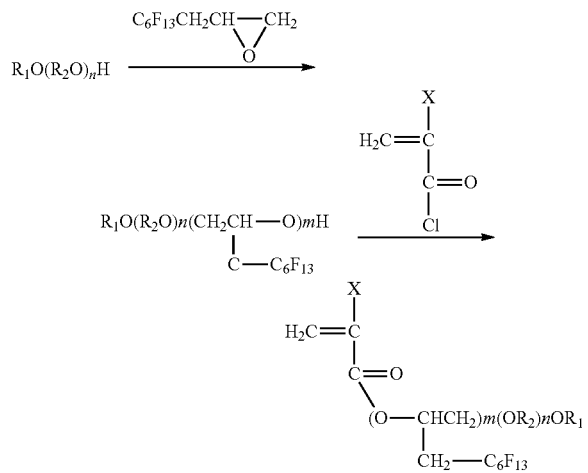

In the reaction formula above, $R_1$, $R_2$, X, m, and n represent the same as in the General formula (III).

The fluorine-containing acrylate ester polymer represented by the General formula (II) (where Rf is $C_6F_{13}$) can be synthesized according to, for example, a reaction formula below.

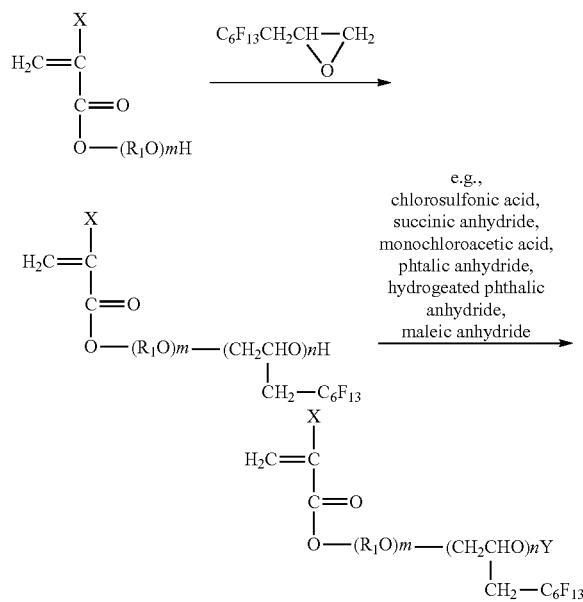

In the reaction formula above, $R_1$, X, m, and n represent the same as in the General formula (III).

The fluorine content ratio in the fluorine-containing acrylate ester polymer is preferably 10% by mass or greater, more preferably 25% by mass or greater, and yet more preferably 50% by mass or greater in terms of an ink repelling property (contact angle).

Examples of the commercially available product include, but are not limited to, KRYTOX FSL (available from Du Pont K.K.), KRYTOX FSH (available from Du Pont K.K.), FOMBLIN Z (available from Solvay Solexis Inc.), FLUOROLINK S10 (available from Solvay Solexis Inc.), OPTOOL DSX (available from DAIKIN INDUSTRIES, LTD.), FLUOROLINK C10 (available from Solvay Solexis Inc.), MORESCO PHOSFAROL A20H (available from MORESCO Corporation), MORESCO PHOSFAROL ADOH (available from MORESCO Corporation). MORESCO PHOSFAROL DDOH (available from MORESCO Corporation), FLUOROSURF FG5010 (available from Fluoro Technology Co., Ltd.), FLUOROSURF FG5020 (available from Fluoro Technology Co., Ltd.), FLUOROSURF FG5060 (available from Fluoro Technology Co., Ltd.), and FLUOROSURF FG5070 (available from Fluoro Technology Co., Ltd.).

The ink-repelling film is formed of a compound film containing the fluorine-containing acrylate ester polymer skeleton in a molecule thereof.

It is optional to provide an inorganic oxide layer between the nozzle substrate and the ink-repelling film in order to provide an abundance of hydroxyl groups serving as bonding points with the compound containing the fluorine-containing acrylate ester polymer skeleton in a molecule thereof and improve adhesiveness.

Examples of the material of the inorganic oxide layer include, but are not limited to. $SiO_2$ and $TiO_2$.

The average thickness of the inorganic oxide layer is preferably 0.001 micrometers or greater but 0.2 micrometers or less and more preferably 0.01 micrometers or greater but 0.1 micrometers or less.

Examples of the compound containing the fluorine-containing acrylate ester polymer skeleton in a molecule thereof include, but are not limited to, low-molecular-weight substances and resins.

Examples of the compound containing the fluorine-containing acrylate ester polymer skeleton in a molecule thereof include, but are not limited to, the compounds disclosed in, e.g., JP-03-43065-B, JP-06-210857-A, JP-10-32984-A, JP-2000-94567-A, JP-2002-145645-A, JP-2003-341070-A, JP-2007-106024-A, and JP-2007-125849-A.

Among these compounds, modified perfluoropolyoxetane (available from DAIKIN INDUSTRIES, LTD., OPTOOL DSX) is preferable as the compound containing the fluorine-containing acrylate ester polymer skeleton in a molecule thereof.

The average thickness of the ink-repelling film is preferably 0.001 micrometers or greater but 0.2 micrometers or less and more preferably 0.01 micrometers or greater but 0.1 micrometers or less.

Examples of the method for forming the ink-repelling film using the compound containing the fluorine-containing acrylate ester polymer skeleton in a molecule thereof include, but are not limited to, such methods as application such as spin coating, roll coating, and dipping, printing, and vacuum vapor deposition using a fluorine-based solvent.

Examples of the fluorine-based solvent include, but are not limited to, NOVEC (available from 3M Corporation), VERTREL (available from Du Pont K.K.), and GALDEN (available from Solvay Solexis Inc.).

—Polymer Having Fluorine-Containing Heterocyclic Structure in Main Chain Thereof—

The polymer having a fluorine-containing heterocyclic structure in the main chain thereof is particularly preferably an amorphous polymer among fluorine-containing polymers having a heterocyclic structure.

The amorphous polymer is excellent in, for example, film strength, adhesiveness with a base material, and film uniformity. Therefore, the amorphous polymer can better exhibit the effect of the present disclosure.

For example, the polymers described in, for example, U.S. Pat. Nos. 3,418,302, 3,978,030, JP-63-238111-A, JP-63-238115-A, JP-01-131214-A, and JP-01-131215-A are suitably used as the polymer having a fluorine-containing heterocyclic structure in the main chain thereof. Among these polymers, the following polymers having a heterocyclic structure are representative of the polymer having a fluorine-containing heterocyclic structure in the main chain thereof. However, the polymer having a fluorine-containing heterocyclic structure in the main chain thereof is not limited to these polymers.

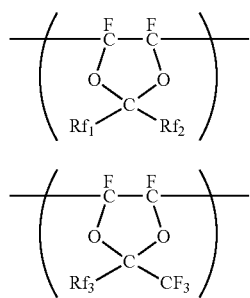

General formula (i)

General formula (ii)

In the General formulae (i) and (ii), $Rf_1$, $Rf_2$, and $Rf_3$ each represent a fluorine-containing alkyl group.

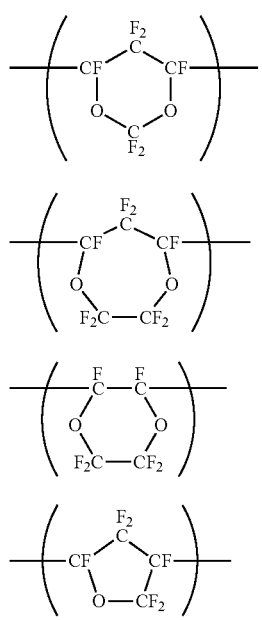

Structural formula (i)

Structural formula (ii)

Structural formula (iii)

Structural formula (iv)

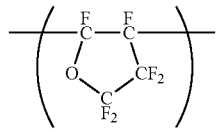

Structural formula (v)

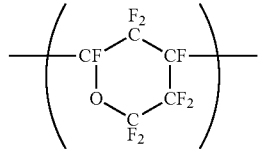

Structural formula (vi)

Moreover, it is optional to introduce the structure represented by General formula (iii) below into the main chain in order to improve adhesiveness with the base material and control glass transition temperature (Tg) and solubility in a solvent. The structure represented by the General formula (iii) is obtained by copolymerization of comonomers represented by Structural formulae (vii) to (ix) below

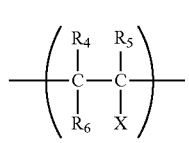

General formula (iii)

In the General formula (iii), $R_4$, $R_5$, and $R_6$ each independently represent a hydrogen atom, a fluorine atom, a chlorine atom, or $Rf_4$.

$Rf_4$ represents a, fluorine-containing alkyl group,

X represents a hydrogen atom, a fluorine atom, a chlorine atom, $Rf_5$, or $Rf_6$.

$Rf_5$ represents a fluorine-containing organic substituent containing a functional group such as acids, esters, alcohols, amines, and amides at an end thereof, $Rf_6$ represents a fluorine-containing alkyl group or a fluorine-containing other group.

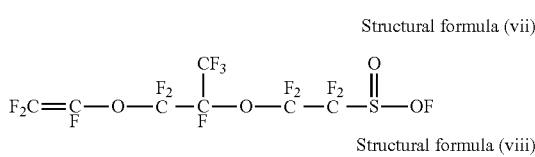

Structural formula (vii)

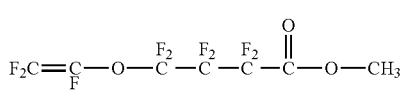

Structural formula (viii)

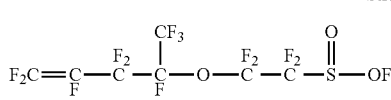

Structural formula (ix)

Examples of a substance having the specific chemical structure presented above and suitable as an ink-repelling treatment agent include, but are not limited to, product name: CYTOP CTX-105 (available from AGC Inc.), product name: CYTOP CTX-805 (available from AGC Inc.), product name: TEFLON (registered trademark) AF1600, and product name: AF2400 (available from Du Pont K.K.).

Examples of the method for forming an ink-repelling film using the polymer having a fluorine-containing heterocyclic structure in the main chain thereof include, but are not limited to, such methods as application such as spin coating, roll coating, and dipping, printing, and vacuum vapor deposition using a fluorine-based solvent.

The fluorine-based solvent is not particularly limited and may be appropriately selected depending on the intended purpose so long as the fluorine-based solvent can dissolve the polymer having a fluorine-containing heterocyclic structure in the main chain thereof.

For example, fluorine solvents such as perfluorobenzene, "product name: AFLUID" (product name: a fluorine-based solvent available from AGC Inc.), and "FLUORINERT FC-75" (product name: a liquid containing perfluoro(2-butyl tetrahydrofuran) available from 3M Corporation) are suitable. One of these fluorine-based solvents may be used alone or two or more of these fluorine-based solvents may be used in combination. Among these fluorine-based solvents, mixture solvents may be used in combination with hydrocarbon-based organic solvents, hydrocarbon chloride-based organic solvents, hydrocarbon fluoride chloride-based organic solvents, alcohol-based organic solvents, and other organic solvents.

The concentration of the solution is preferably 0.01% by mass or greater but 50% by mass or less and more preferably 0.01% by mass or greater but 20% by mass or less.

The ink-repelling film can sufficiently serve the intended purpose when the average thickness of the ink-repelling film is 0.01 micrometers or greater. However, the average thickness of the ink-repelling film is preferably 0.01 micrometers or greater but 2 micrometers or less.

The thermal treatment condition (temperature) for the polymer having a fluorine-containing heterocyclic structure in the main chain thereof is determined by the boiling point of the solvent, the glass transition temperature of the polymer, and the heat-resistant temperature of the base material. That is, it is appropriate to select a temperature higher than the boiling point of the solvent and the glass transition temperature of the polymer and lower than the heat-resistant temperature of the base material.

The glass transition temperature of the polymer having a fluorine-containing heterocyclic structure in the main chain thereof varies depending on the structure of the polymer.

For example, most of the polymers having the structures represented by the Structural formulae (iv) to (vi) above have a glass transition temperature of 50 degrees C. or higher but 110 degrees C. or lower. Therefore, among the thermal treatment conditions, the temperature is preferably 120 degrees C. or higher but 170 degrees C. or lower, and the time is preferably from 30 minutes through 2 hours.

A copolymer containing the structure of the General formula (ii) above and the structure of Structural formula (x) below in the main chain thereof is commercially available from Du Pont K.K. under a trademark "TEFLON (registered trademark) AF".

Structural formula (x)

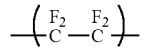

It is possible to vary the glass transition temperature of TEFLON (registered trademark) AF by varying the copolymerization ratio thereof. That is, the product has a higher glass transition temperature as the ratio of PDD [perfluoro (2,2-dimethyl-1,3-dioxole)] component in the product is higher. Depending on the ratio of the PDD component, there are products having a glass transition temperature of 80 degrees C. or higher but 330 degrees C. or lower. Commercially available products have a glass transition temperature of 160 degrees C. (AF1600) and a glass transition temperature of 240 degrees C. (AF2400). For example, the thermal treatment temperature for the product having a glass transition temperature of 160 degrees C. is preferably 165 degrees C. or higher but 180 degrees C. or lower taking into consideration also the heat-resistant temperature of the base material.

—Other Members—

The other members are not particularly limited and may be appropriately selected depending on the intended purpose. Examples of the other members include, but are not limited to, pressurizing chambers, and a stimulus generating unit.

—Pressurizing Chambers—

The pressurizing chambers are disposed in individual correspondence with a plurality of nozzle holes formed in the nozzle plate. The pressurizing chambers are embodied as a plurality of individual flow paths communicating with the nozzle holes, and may be referred to as, for example, ink flow paths, pressurizing liquid chambers, pressure chambers, discharging chambers, and liquid chambers.

—Unit Configured to Discharge Ink—

The discharging head includes a unit configured to generate a stimulus to be applied to the ink.

The stimulus of the stimulus generating unit is not particularly limited and may be appropriately selected depending on the intended purpose. Examples of the stimulus include, but are not limited to, heat (temperature), pressure, vibration, and light.

One of these stimuli may be used alone or two or more of these stimuli may be used in combination.

Among these stimuli, heat and pressure are suitable as the stimulus of the stimulus generating unit.

Examples of the stimulus generating unit include, but are not limited to, a heating device, a pressurizing device, a piezoelectric element, a vibration generating device, an ultrasonic oscillator, and a light.

Specific examples of the stimulus generating unit include, but are not limited to, a piezoelectric actuator such as a piezoelectric element, a thermal actuator using an electro-thermal transducer such as a heat resistor to utilize a phase change of the ink due to film boiling of the ink, a shape memory alloy actuator utilizing a metal phase change due to a temperature change, and an electrostatic actuator utilizing an electrostatic force.

When the stimulus is "heat", for example, a thermal head is used to apply a thermal energy corresponding to a recording signal to the ink in the ink discharging head.

For example, it is possible to employ a method of generating bubbles in the ink by the thermal energy and discharging the ink through the nozzle hole of the nozzle plate in the form of a liquid droplet under the pressure of the bubbles.

When the stimulus is "pressure", for example, it is possible to employ a method of applying a voltage to the piezoelectric element bonded at a position called the pressure chamber present in the ink flow path in the ink discharging head to bend the piezoelectric element and shrink the volume of the pressure chamber by bending of the piezoelectric element, to discharge the ink through the nozzle hole of the ink discharging head in the form of a liquid droplet.

Among such methods, when the stimulus is "pressure", a piezo method of applying a voltage to the piezo element to fly the ink is preferable.

Here, an example of the discharging head used in the present disclosure will be described with reference to FIG. 3 to FIG. 8.

Figure 3:
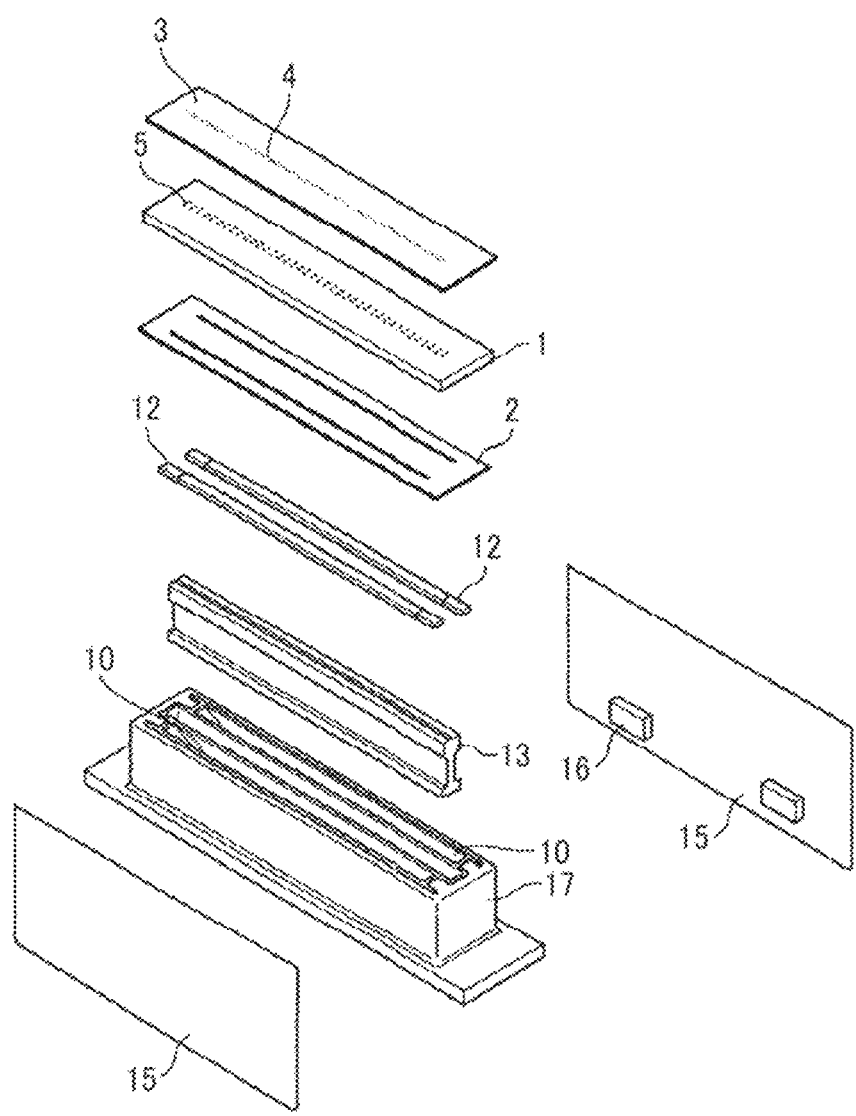
FIG. 3 is an exploded perspective view illustrating a discharging head used in an inkjet printing apparatus of the present disclosure.
Figure 4:
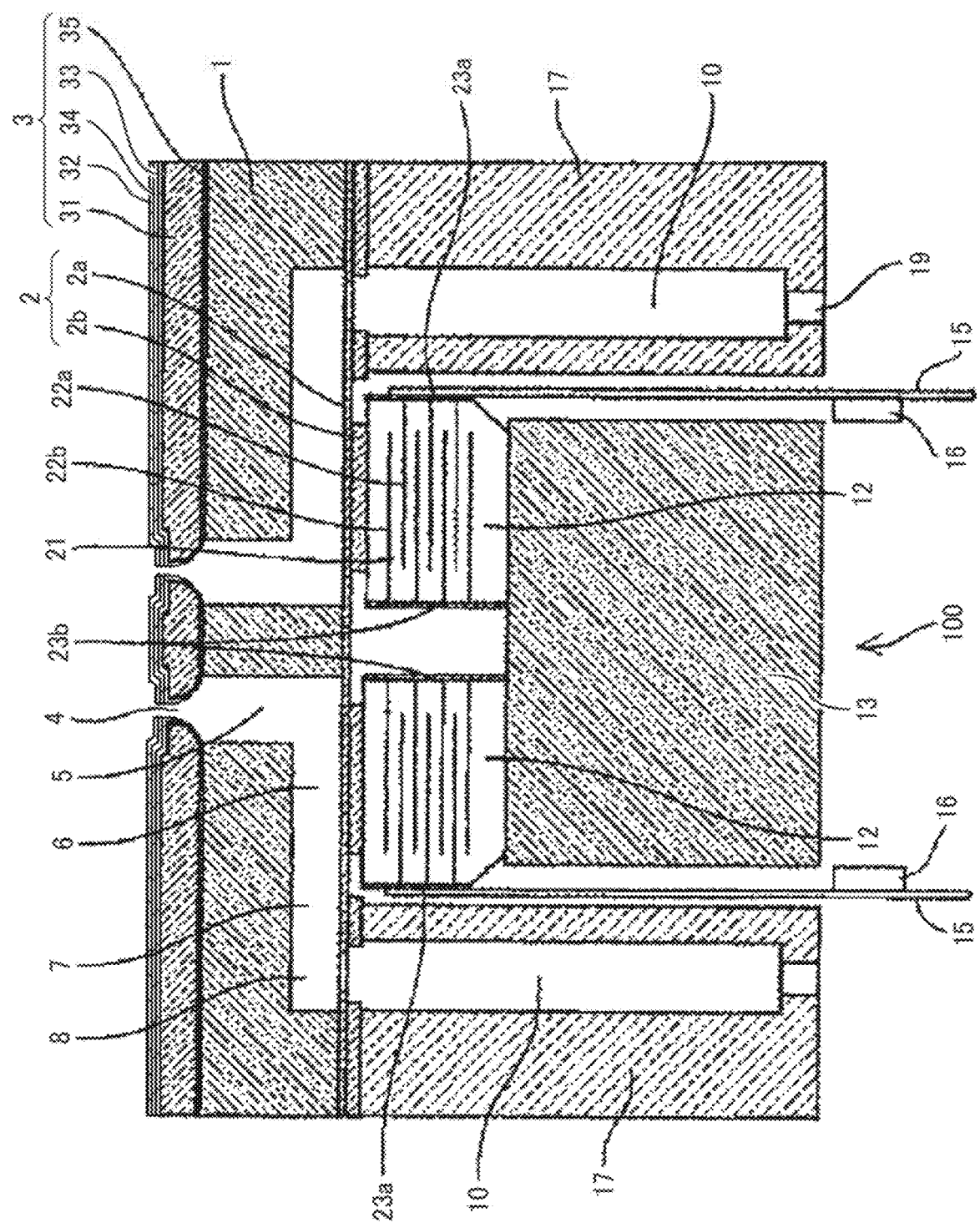
FIG. 4 is a cross-sectional view of a discharging head used in an inkjet printing apparatus of the present disclosure, taken along a longer direction of a liquid chamber.
Figure 5:
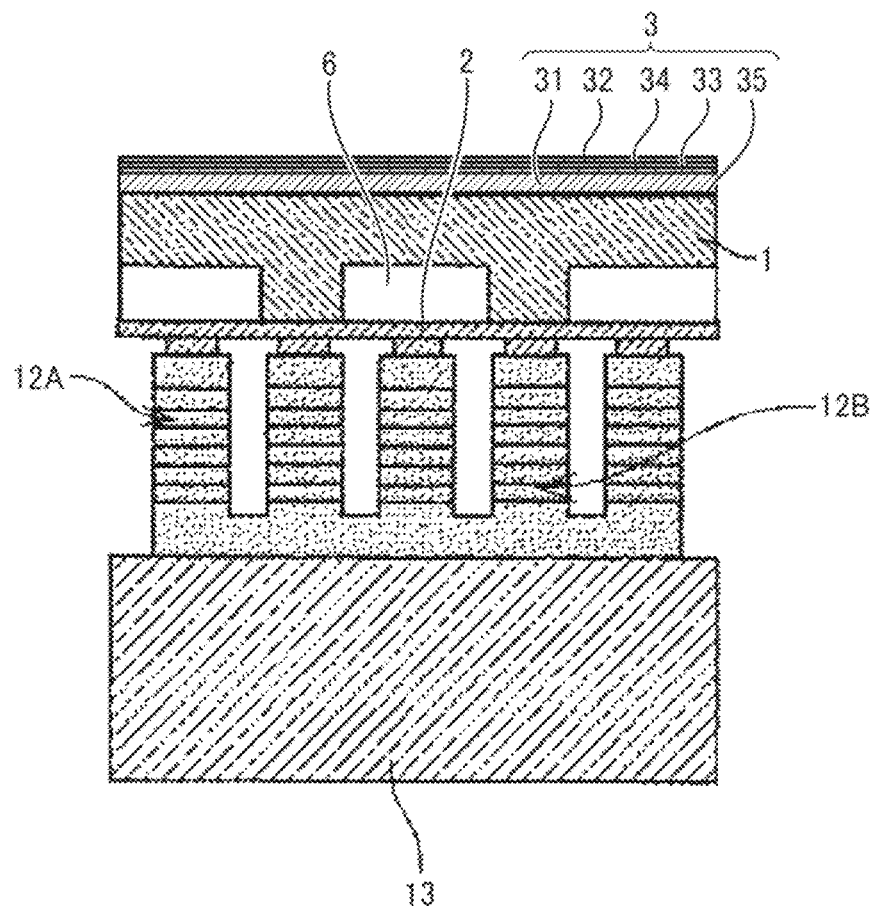
FIG. 5 is a cross-sectional view of a discharging head used in an inkjet printing apparatus of the present disclosure, taken along a shorter direction of a liquid chamber.

FIG. 3 is an exploded perspective view of the discharging head. FIG. 4 is a cross-sectional view of the discharging head taken along a direction (liquid chamber longer direction) orthogonal to the nozzle arranging direction. FIG. 5 is a cross-sectional view of the discharging head taken along the nozzle arranging direction (liquid chamber shorter direction).

The discharging head includes a flow path plate (liquid chamber substrate, flow path member) 1, a vibration plate member 2 joined to the lower surface of the flow path plate 1, and a nozzle plate 3 joined to the upper surface of the flow path plate 1 and serving as a member in which nozzles are formed. An inkjet printing apparatus may include a discharging head including the nozzle plate 3 with whose surface facing a print medium each ink of the ink set has a receding contact angle of 35 degrees C. or greater.

With these members, the discharging head forms a plurality of liquid chambers 6 serving as individual flow paths with which a plurality of nozzle holes 4 through which liquid droplets (ink droplets) are discharged communicate via nozzle communicating paths 5, fluid resistor sections 7 also serving as supply paths for supplying inks to the liquid chambers 6, and communicating sections 8 communicating with the liquid chambers 6 via the fluid resistor sections 7. The ink is supplied to the communicating sections 8 from a common liquid chamber 10 formed in a frame member 17 through a supply port 19 formed in the vibration plate member 2. The plurality of liquid chambers may be referred to as, for example, pressurizing liquid chambers, pressure chambers, and flow paths.

The flow path plate 1 is a silicone substrate in which openings such as the communicating paths 5, the liquid chambers 6, and the fluid resistor sections 7 are formed by etching.

It is optional to form the flow path plate 1 by etching, for example, a SUS substrate using an acidic etching solution or machining, for example, a SUS substrate by, for example, punching (press).

The vibration plate member 2 includes vibration regions (diaphragm sections) 2a corresponding to the liquid chambers 6 respectively and forming the wall surfaces of the liquid chambers 6. The vibration plate member 2 includes island-like protrusions 2b outside the plane of the vibration regions 2a (at a side opposite to the liquid chambers 6). The top end surfaces (joining surfaces) of piezoelectric element columns 12A and 12B of lamination-type piezoelectric elements 12 and 12 serving as driving elements (actuator units or pressure generating unit) configured to generate energy for deforming the vibration regions 2a to discharge liquid droplets are joined to the island-like protrusions 2b. The lower surfaces of the lamination-type piezoelectric elements 12 are joined to a base member 13.

The piezoelectric element 12 is formed as an alternate laminate of piezoelectric material layers 21 such as PZT and internal electrodes 22a and 22b. The internal electrodes 22a and 22b of the piezoelectric element 12 are drawn out to the end surfaces, i.e., to the side surfaces of the piezoelectric element 12 approximately perpendicular to the vibration plate member 2. The piezoelectric element 12 is coupled to end surface electrodes (external electrodes) 23a and 23b formed on the side surfaces of the piezoelectric element 12 approximately perpendicular to the vibration plate member 2. When a voltage is applied to the end surface electrodes (external electrodes) 23a and 23b, the piezoelectric element 12 is displaced in the lamination direction.

These piezoelectric elements 12 are formed as a needed number of piezoelectric element columns 12A and 12B that are formed out of one piezoelectric element member by grooving by half-cut dicing.

The piezoelectric element columns 12A and 12B of the piezoelectric elements 12 are identical members. However, there is a distinction that piezoelectric element columns to be driven by application of a drive waveform are piezoelectric element columns 12A for driving, and piezoelectric element columns used as mere supports without application of a drive waveform are piezoelectric element columns 12B for supports.

In this case, it is optional whether to employ a by-pitch configuration in which the piezoelectric element columns 12A for driving and the piezoelectric element columns 12B for supports are used alternately, or a normal pitch configuration in which all piezoelectric element columns are used as the piezoelectric element columns 12A for driving.

The piezoelectric element columns 12A and 12B of the piezoelectric elements 12 are configured as two lines of driving element columns (two lines of piezoelectric element columns 12A for driving) in which a plurality of piezoelectric element columns 12A for driving, serving as driving elements, are arranged side by side on the base member 13.

The piezoelectric direction in which the lamination-type piezoelectric elements 12 are displaced to pressurize the ink in the liquid chambers 6 is the lamination direction of the piezoelectric material layer. The piezoelectric direction in which the lamination-type piezoelectric elements 12 are displaced to pressurize the ink in the pressurizing liquid chambers 6 may be the planar direction of the piezoelectric material layer that is a direction orthogonal to the electric field.

The piezoelectric element material is not particularly limited. Electromechanical transducers such as ferroelectrics such as $BaTiO_3$, $PbTiO_3$, and $(NaK)NbO_3$ commonly used as piezoelectric element materials may be used.

Lamination types are used as the piezoelectric elements. However, single-plate piezoelectric elements may be used.

Single-plate piezoelectric elements may be cut elements, screen-printed and sintered thick film-like elements, or thin film elements formed by sputtering, vapor deposition, or sol-gel methods.

The lamination-type piezoelectric elements 12 may be provided in one line or in a plurality of lines on one base member 13.

A flexible printed circuit (FPC) 15 serving as a wiring unit is directly coupled to the external electrode 23a of each piezoelectric element column 12A for driving of the piezoelectric element 12 by a solder member in order to apply a drive signal to the external electrode 23a. The FPC 15 is mounted with a drive circuit (driver IC) 16 configured to selectively apply a drive waveform to each piezoelectric element column 12A for driving of the piezoelectric element 12.

The external electrodes 23b of all the piezoelectric element columns 12A for driving are electrically commonly coupled to one another and likewise coupled to the common wiring of the FPC 15 by a solder member.

The output terminal portion of the FPC 15 joined to the piezoelectric elements 12 is plated with solder and can be joined as a solder joint. However, not the FPC 15 but the piezoelectric elements 12 may be plated with solder.

The joining method is not limited to solder joint, but may be joining using an anisotropic conductive film, or wire bonding.

The nozzle plate 3 is formed of; a nozzle substrate 31 having hole portions that constitute nozzle holes 4 having a diameter of 10 micrometers or greater but 35 micrometers or less in correspondence with the liquid chambers 6; and an ink-repelling film 32 formed on the liquid droplet discharging-side surface (the surface facing the discharging direction, a discharging surface, or a surface opposite to the liquid chamber 6 side, a nozzle formed surface) of the nozzle substrate 31.

The frame member 17 formed by injection molding of an epoxy-based resin or polyphenylene sulfite is joined to the outer circumference of a piezoelectric actuator unit 100 formed of, for example, the piezoelectric elements 12 on which the FPC 15 is mounted (or coupled) and the base member 13.

In the frame member 17, the common liquid chamber 10 described above and the supply port 19 through which an ink is supplied from outside into the common liquid chamber 10 are formed. The supply port 19 is further coupled to an ink supply source such as a sub tank or an ink storing container.

In the discharging head configured as described above, the piezoelectric element columns 12A for driving shrink when the voltage applied to the piezoelectric element columns 12A for driving is lowered from a reference potential. The vibration regions 2a of the vibration plate member 2 go down and the volume of the liquid chambers 6 expands. As a result, the ink flow into the liquid chambers 6. Subsequently, the voltage applied to the piezoelectric element columns 12A is raised to extend the piezoelectric element columns 12A in the lamination direction. The vibration plate member 2 is deformed toward the nozzle holes 4 to shrink the volume of the liquid chambers 6. As a result, the ink in the liquid chambers 6 is pressurized and liquid droplets of the ink are discharged (jetted) through the nozzle holes 4.

Then, when the voltage applied to the piezoelectric element columns 12A is returned to the reference potential, the vibration plate member 2 returns to the initial position, and the liquid chambers 6 expand to generate a negative pressure. Here, the ink is filled into the liquid chambers 6 from the common liquid chamber 10.

Then, after vibrations of the meniscus surfaces of the nozzle holes 4 attenuate and stabilize, there occurs a shift to the next liquid droplet discharging operation.

The method for driving the discharging head is not limited to the example described above (pull-push driving). Depending on the method for applying a drive waveform, pull driving or push driving is possible.

Figure 6:
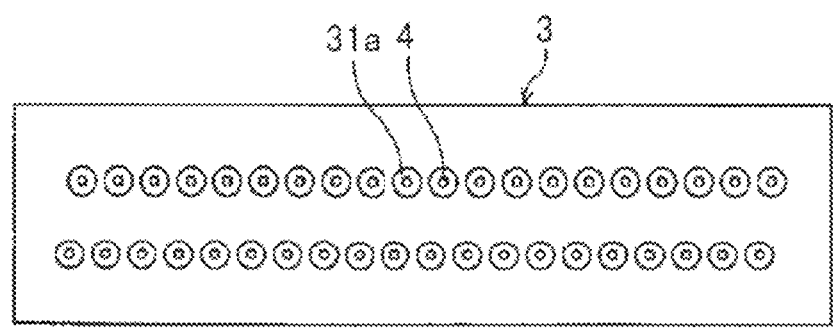
FIG. 6 is a plan view of a nozzle plate of a discharging head used in an inkjet printing apparatus of the present disclosure.
Figure 7:
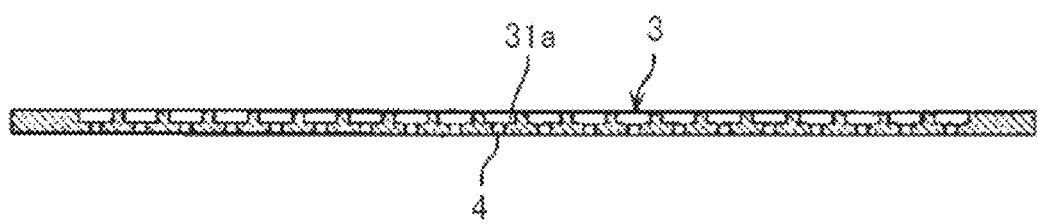
FIG. 7 is a cross-sectional view of the nozzle plate illustrated in FIG. 6.
Figure 8:
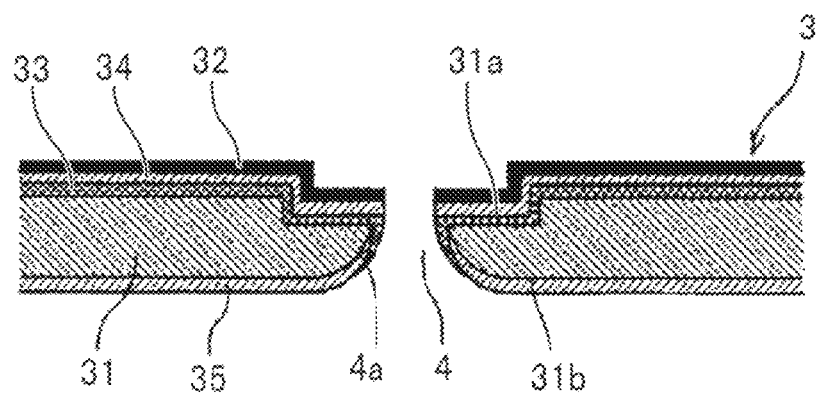
FIG. 8 is an expanded cross-sectional view of one nozzle portion of the nozzle plate.

Next, the details of the nozzle plate 3 of the inkjet printing apparatus of the present disclosure will be descried with reference to FIG. 6 to FIG. 8. FIG. 6 is a plan view of the nozzle plate 3. FIG. 7 is a cross-sectional view of the nozzle plate 3. FIG. 8 is an expanded cross-sectional view of one nozzle portion of the nozzle plate 3.

The nozzle plate 3 includes a nozzle substrate 31 formed of a Ni metal plate. On a discharging surface 31a of the nozzle substrate 31, a Ti layer 33 serving as a foundation layer, a $SiO_2$ film 34, and a perfluoro polyether film (referred to as "water-repelling film") 32 containing alkoxysilane in a molecule thereof are deposited in this order from the surface of the nozzle substrate 31.

Each ink of the ink set has a receding contact angle of 35 degrees or greater on a surface of the nozzle plate 3 facing a print medium except the nozzle holes.

At a portion of an internal wall surface 4a of the nozzle hole 4 near the outlet, the foundation layer (Ti layer) 33 is deposited continuously from the discharging surface to a $SiO_2$ film 35 formed on a liquid chamber surface 31b of the nozzle substrate 31. The foundation layer (Ti layer) 33 is exposed to the outermost surface.

For example, a Ni metal plate can be used as the nozzle substrate 31. However, this is non-limiting.

The water-repelling film 32 of the nozzle plate 3 is formed by vapor deposition. No vapor deposited film constituting the water-repelling film 32 is formed at the portion of the internal wall surface of the nozzle hole 4 near the outlet.

This enables the nozzle plate 3 to discharge liquid droplet stably without discharging failure and without spoiling the liquid filling efficiency.

EXAMPLES

The present disclosure will be described below by way of Examples. The present disclosure should not be construed as being limited to these Examples. Unless otherwise particularly specified, for examples, preparations, productions, and evaluations in Examples were performed at room temperature of 25 degrees C. at a humidity of 60% RH.

(Pigment Dispersion Liquid Preparation Example 1)
<Preparation of Black Pigment Dispersion Liquid 1>
—Synthesis of Polymer A—

Styrene (11.2 g), acrylic acid (2.8 g), lauryl methacrylate (12 g), polyethylene glycol methacrylate (4 g), styrene macromer (4 g), and mercapto ethanol (0.4 g) were mixed and heated to 65 degrees C.

Next, a mixture solution of styrene (100.8 g), acrylic acid (25.2 g), lauryl methacrylate (108 g), polyethylene glycol methacrylate (36 g), hydroxylethyl methacrylate (60 g), styrene macromer (36 g), mercapto ethanol (3.6 g), azobis methylvaleronitrile (2.4 g), and methyl ethyl ketone (18 g) was dropped into a flask for 2.5 hours.

After the dropping, a mixture solution of azobis methylvaleronitrile (0.8 g) and methyl ethyl ketone (18 g) was dropped into the flask for 0.5 hours.

After the resultant was aged at 65 degrees C. for 1 hour, azobis methylvaleronitrile (0.8 g) was added, and the resultant was further aged for 1 hour.

After the reaction ended, methyl ethyl ketone (364 g) was added into the flask, to obtain a polymer solution A (800 g) having a solid concentration of 50% by mass.
—Preparation of Black Pigment Dispersion Liquid 1—

Next, the polymer solution A (28 g), carbon black (obtained from Cabot Corporation, BLACK PEARLS 1000) (42 g), a 1 mol/L potassium hydroxide aqueous solution (13.6 g), methyl ethyl ketone (20 g), and water (13.6 g) were sufficiently stirred, and then kneaded using a roll mill.

The obtained paste was added to pure water (200 g) and sufficiently stirred. Subsequently, methyl ethyl ketone was removed from the resultant with an evaporator, and the resultant was subjected to pressure filtration through a polyvinylidene fluoride membrane filter having an average pore diameter of 5 micrometers. Subsequently, the water content of the resultant was adjusted in a manner that the solid concentration would be 20% by mass, to obtain a styrene-acrylic-based resin-coated black pigment dispersion liquid 1 having a solid concentration of 20% by mass and a pigment concentration of 15% by mass.

(Pigment Dispersion Liquid Preparation Example 2)
<Preparation of Cyan Pigment Dispersion Liquid 1>

A styrene-acrylic-based resin-coated cyan pigment dispersion liquid 1 having a solid concentration of 20% by mass and a pigment concentration of 15% by mass was obtained in the same manner as in Pigment dispersion liquid preparation example 1, except that unlike in Pigment dispersion liquid preparation example 1, Pigment Blue 15:4 (obtained from Sensient Technologies Corporation, SMART CYAN 3154BA) was used instead of carbon black.
(Pigment Dispersion Liquid Preparation Example 3)
<Preparation of Magenta Pigment Dispersion Liquid 1>

A styrene-acrylic-based resin-coated magenta pigment dispersion liquid 1 having a solid concentration of 20% by mass and a pigment concentration of 15% by mass was obtained in the same manner as in Pigment dispersion liquid preparation example 1, except that unlike in Pigment dispersion liquid preparation example 1, Pigment Red 122 (obtained from Sun Chemical Corporation, PIGMENT RED 122) was used instead of carbon black.
(Pigment Dispersion Liquid Preparation Example 4)
<Preparation of Yellow Pigment Dispersion Liquid 1>

A styrene-acrylic-based resin-coated yellow pigment dispersion liquid 1 having a solid concentration of 20% by mass and a pigment concentration of 15% by mass was obtained in the same manner as in Pigment dispersion liquid preparation example 1, except that unlike in Pigment dispersion liquid preparation example 1, Pigment Yellow 74 (obtained from Sensient Technologies Corporation, SMART YELLOW 3074BA) was used instead of carbon black.
(Polyurethane Resin Emulsion Preparation Example 1)
<Preparation of Polyester-Based Urethane Resin Emulsion 1>

In a container equipped with a thermometer, a nitrogen gas introducing pipe, and a stirrer and purged with nitrogen, a double quantity of polyester polyol (product name: POLYLITE OD-X-2251, obtained from DIC Corporation, with an average molecular weight of 2,000) (200.4 g), 2,2-dimethylolpropionic acid (15.7 g), isophorone diisocyanate (48.0 g), methyl ethyl ketone (77.1 g) serving as an organic solvent were allowed to undergo a reaction using dibutyl tin dilaurate (DMTDL) (0.06 g) as a catalyst. After the reaction was continued for 4 hours, methyl ethyl ketone (30.7 g) serving as a diluting solvent was supplied to the resultant, and the reaction was further continued. When the average molecular weight of the reaction product reached the range of from 20,000 through 60,000, methanol (1.4 g) was added to the resultant, and the reaction was terminated, to obtain a solution of a urethane resin in an organic solvent.

Next, a 48% by mass potassium hydroxide aqueous solution (13.4 g) was added to the solution of a urethane resin in an organic solvent, to neutralize the carboxyl group contained in the urethane resin. Next, water (715.3 g) was added to the resultant, and the resultant was sufficiently stirred, and then aged and desolventized, to obtain a polyester-based urethane resin emulsion 1 having a solid concentration of 30% by mass.

The minimum filming temperature (MFT) of the obtained polyester-based urethane resin emulsion 1 measured with a "filming temperature tester" (obtained from Imoto Machinery Co., Ltd.) was 74 degrees C.
(Ink Production Example 1)
<Production of Black Ink A>

After preparation of the ink prescription described below to adjust the total amount to 100 parts by mass with addition of ion-exchanged water, the components were mixed and stirred, and filtrated through a filter having an average pore diameter of 5 micrometers (obtained from Sartorius AG, MINISART), to produce a black ink A.
[Ink Prescription]

Black pigment dispersion liquid 1 described above: 18.0 parts by mass
Polyester-based urethane resin emulsion 1 (with a solid concentration of 30% by mass): 20.0 parts by mass
3-Methoxy-N,N-dimethylpropane amide represented by General formula (1) above; 10.0 parts by mass
Propylene glycol: 20.0 parts by mass
2-Ethyl-1,3-hexanediol: 1.0 part by mass
2,2,4-Trimethyl-1,3-pentediol: 2.0 parts by mass
SILFACE SAG503A (obtained from Nissin Chemical Industry Co., Ltd.): 1.0 part by mass
Ion-exchanged ater: balance (total: 100 parts by mass)
(Ink Production Examples 2 to 33)
<Production of Black Inks B to C, Cyan Inks A to H, Magenta Inks A to H, Yellow Inks A to C, Light Cyan inks A to E, and Light Magenta Inks A to F>

Black inks B to C, cyan inks A to H, magenta inks A to H, yellow inks A to C, light cyan inks A to E, and light magenta inks A to F were produced in the same manner as in Ink production example 1, except that unlike in Ink production example 1, the ink prescription was changed to as described in Table 1 to Table 6.

In Table 1 to Table 6, UNIDYNE DSN43N is a fluorosurfactant (obtained from DAIKIN INDUSTRIES, LTD.).

TABLE 1

| | | Black ink No. | | |
|---|---|---|---|---|
| | | A | B | C |
| Pigment dispersion | Black pigment dispersion 1 (pigment concentration: 15% by mass) | 18.0 | 18.0 | 18.0 |
| | Cyan pigment dispersion 1 (pigment concentration: 15% by mass) | | | |
| | Magenta pigment dispersion 1 (pigment concentration: 15% by mass) | | | |
| | Yellow pigment dispersion 1 (pigment concentration: 15% by mass) | | | |
| Resin | Polyester-based urethane resin emulsion 1 (solid concentration: 30% by mass) | 20.0 | 25.0 | 15.0 |
| Organic solvent of General formula (1) | 3-Methoxy-N,N-dimethylpropane amide | 10.0 | 10.0 | |
| | 3-Butoxy-N,N-dimethylpropane amide | | | |

TABLE 1-continued

|  |  | Black ink No. | | |
|---|---|---|---|---|
|  |  | A | B | C |
| Organic solvent | Propylene glycol | 20.0 | 15.0 | 5.0 |
|  | 1,3-Butanediol |  |  | 20.0 |
|  | Ethylene glycol monobutyl ether |  | 5.0 |  |
|  | 2-Ethyl-1,3-hexanediol | 1.0 | 3.0 | 3.0 |
|  | 2,2,4-Trimethyl-1,3-pentanediol | 2.0 |  | 0.0 |
| Surfactant | SILFACE SAG503A | 1.0 |  | 0.8 |
|  | UNIDYNE DSN403N |  | 0.5 |  |
| Water | Ion-exchanged water | Balance | Balance | Balance |
|  | Total (% by mass) | 100 | 100 | 100 |

15

TABLE 2

|  |  | Cyan ink No. | | | | | | | |
|---|---|---|---|---|---|---|---|---|---|
|  |  | A | B | C | D | E | F | G | H |
| Pigment dispersion | Black pigment dispersion 1 (pigment concentration: 15% by mass) |  |  |  |  |  |  |  |  |
|  | Cyan pigment dispersion 1 (pigment concentration: 15% by mass) | 16.7 | 14.0 | 23.3 | 17.3 | 16.7 | 10.0 | 16.0 | 20.0 |
|  | Magenta pigment dispersion 1 (pigment concentration: 15% by mass) |  |  |  |  |  |  |  |  |
|  | Yellow pigment dispersion 1 (pigment concentration: 15% by mass) |  |  |  |  |  |  |  |  |
| Resin | Polyester-based urethane resin emulsion 1 (solid concentration: 30% by mass) | 20.0 | 20.0 | 20.0 | 20.0 | 20.0 | 20.0 | 20.0 | 20.0 |
| Organic solvent of General formula (1) | 3-Methoxy-N,N-dimethylpropane amide | 10.0 | 10.0 | 12.0 | 10.0 | 10.0 |  | 10.0 | 10.0 |
|  | 3-Butoxy-N,N-dimethylpropane amide |  |  |  |  |  |  |  |  |
| Organic solvent | Propylene glycol | 20.0 |  | 20.0 | 15.0 |  | 5.0 | 20.0 | 15.0 |
|  | 1,3-Butanediol |  | 15.0 |  |  | 15.0 | 20.0 |  | 5.0 |
|  | Ethylene glycol monobutyl ether |  |  |  | 5.0 |  |  |  |  |
|  | 2-Ethyl-1,3-hexanediol | 2.0 |  | 1.0 | 3.0 | 3.0 | 3.0 | 1.0 | 2.0 |
|  | 2,2,4-Trimethyl-1,3-pentanediol |  | 2.0 | 1.0 |  |  |  |  |  |
| Surfactant | SILFACE SAG503A | 1.0 | 1.0 | 1.0 |  | 1.2 | 1.0 | 1.0 | 1.0 |
|  | UNIDYNE DSN403N |  |  |  | 0.5 |  |  |  |  |
| Water | Ion-exchanged water | Balance | Balance | Balance | Balance | Balance | Balance | Balance | Balance |
|  | Total (% by mass) | 100 | 100 | 100 | 100 | 100 | 100 | 100 | 100 |

TABLE 3

|  |  | Magenta ink No. | | | | | | | |
|---|---|---|---|---|---|---|---|---|---|
|  |  | A | B | C | D | E | F | G | H |
| Pigment dispersion | Black pigment dispersion 1 (pigment concentration: 15% by mass) |  |  |  |  |  |  |  |  |
|  | Cyan pigment dispersion 1 (pigment concentration: 15% by mass) |  |  |  |  |  |  |  |  |
|  | Magenta pigment dispersion 1 (pigment concentration: 15% by mass) | 16.7 | 14.0 | 23.3 | 17.3 | 16.7 | 10.0 | 16.0 | 20.0 |
|  | Yellow pigment dispersion 1 (pigment concentration: 15% by mass) |  |  |  |  |  |  |  |  |

TABLE 3-continued

|  |  | Magenta ink No. | | | | | | | |
|---|---|---|---|---|---|---|---|---|---|
|  |  | A | B | C | D | E | F | G | H |
| Resin | Polyester-based urethane resin emulsion 1 (solid concentration: 30% by mass) | 20.0 | 20.0 | 20.0 | 20.0 | 20.0 | 20.0 | 20.0 | 20.0 |
| Organic solvent of General formula (1) | 3-Methoxy-N,N-dimethylpropane amide | 10.0 |  | 8.0 | 14.0 | 10.0 |  | 10.0 | 10.0 |
|  | 3-Butoxy-N,N-dimethylpropane amide |  | 10.0 |  |  |  |  |  |  |
| Organic solvent | Propylene glycol | 15.0 | 15.0 | 20.0 | 15.0 | 20.0 | 10.0 | 20.0 | 15.0 |
|  | 1,3-Butanediol |  |  |  | 5.0 |  | 15.0 |  | 5.0 |
|  | Ethylene glycol monobutyl ether |  |  |  |  |  | 5.0 |  |  |
|  | 2-Ethyl-1,3-hexanediol | 2.0 |  |  | 1.0 | 3.0 | 3.0 | 1.0 | 2.0 |
|  | 2,2,4-Trimethyl-1,3-pentanediol |  | 2.0 | 2.0 | 1.0 |  |  |  |  |
| Surfactant | SILFACE SAG503A | 1.0 | 0.8 | 1.0 |  | 1.0 | 1.0 | 1.0 | 1.0 |
|  | UNIDYNE DSN403N |  |  |  | 0.5 |  |  |  |  |
| Water | Ion-exchanged water | Balance | Balance | Balance | Balance | Balance | Balance | Balance | Balance |
|  | Total (% by mass) | 100 | 100 | 100 | 100 | 100 | 100 | 100 | 100 |

TABLE 4

|  |  | Yellow ink No. | | |
|---|---|---|---|---|
|  |  | A | B | C |
| Pigment dispersion | Black pigment dispersion 1 (pigment concentration: 15% by mass) |  |  |  |
|  | Cyan pigment dispersion 1 (pigment concentration: 15% by mass) |  |  |  |
|  | Magenta pigment dispersion 1 (pigment concentration: 15% by mass) |  |  |  |
|  | Yellow pigment dispersion 1 (pigment concentration: 15% by mass) | 18.0 | 18.0 | 18.0 |
| Resin | Polyester-based urethane resin emulsion 1 (solid concentration: 30% by mass) | 20.0 | 20.0 | 25.0 |
| Organic solvent of General formula (1) | 3-Methoxy-N,N-dimethylpropane amide | 10.0 | 10.0 |  |
|  | 3-Butoxy-N,N-dimethylpropane amide |  |  |  |
| Organic solvent | Propylene glycol | 20.0 | 25.0 | 10.0 |
|  | 1,3-Butanediol |  |  | 15.0 |
|  | Ethylene glycol monobutyl ether |  |  |  |
|  | 2-Ethyl-1,3-hexanediol | 2.0 | 1.0 | 2.0 |
|  | 2,2,4-Trimethyl-1,3-pentanediol |  | 1.0 |  |
| Surfactant | SILFACE SAG503A | 1.0 |  | 1.2 |
|  | UNIDYNE DSN403N |  | 0.5 |  |
| Water | Ion-exchanged water | Balance | Balance | Balance |
|  | Total (% by mass) | 100 | 100 | 100 |

TABLE 5

|  |  | Light cyan ink No. | | | | |
|---|---|---|---|---|---|---|
|  |  | A | B | C | D | E |
| Pigment dispersion | Black pigment dispersion 1 (pigment concentration: 15% by mass) |  |  |  |  |  |
|  | Cyan pigment dispersion 1 (pigment concentration: 15% by mass) | 6.0 | 4.0 | 4.7 | 4.0 | 6.0 |
|  | Magenta pigment dispersion 1 (pigment concentration: 15% by mass) |  |  |  |  |  |
|  | Yellow pigment dispersion 1 (pigment concentration: 15% by mass) |  |  |  |  |  |
| Resin | Polyester-based urethane resin emulsion 1 (solid concentration: 30% by mass) | 20.0 | 20.0 | 20.0 | 20.0 | 20.0 |
| Organic solvent of General formula (1) | 3-Methoxy-N,N-dimethylpropane amide | 10.0 | 5.0 | 4.0 |  | 5.0 |
|  | 3-Butoxy-N,N-dimethylpropane amide |  | 5.0 |  |  |  |

TABLE 5-continued

| | | Light cyan ink No. | | | | |
| --- | --- | --- | --- | --- | --- | --- |
| | | A | B | C | D | E |
| Organic solvent | Propylene glycol | 5.0 | 20.0 | 20.0 | 20.0 | 15.0 |
| | 1,3-Butanediol | 15.0 | | | 5.0 | 10.0 |
| | Ethylene glycol monobutyl ether | | | 5.0 | | |
| | 2-Ethyl-1,3-hexanediol | 2.0 | 2.0 | 1.0 | 3.0 | 1.0 |
| | 2,2,4-Trimethyl-1,3-pentanediol | | | 1.0 | | |
| Surfactant | SILFACE SAG503A | 1.0 | | 0.8 | 1.0 | 1.0 |
| | UNIDYNE DSN403N | | 0.5 | | | |
| Water | Ion-exchanged water | Balance | Balance | Balance | Balance | Balance |
| | Total (% by mass) | 100 | 100 | 100 | 100 | 100 |

TABLE 6

| | | Light magenta ink No. | | | | | |
| --- | --- | --- | --- | --- | --- | --- | --- |
| | | A | B | C | D | E | F |
| Pigment dispersion | Black pigment dispersion 1 (pigment concentration: 15% by mass) | | | | | | |
| | Cyan pigment dispersion 1 (pigment concentration: 15% by mass) | | | | | | |
| | Magenta pigment dispersion 1 (pigment concentration: 15% by mass) | 7.3 | 6.0 | 4.7 | 6.0 | 7.3 | 6.0 |
| | Yellow pigment dispersion 1 (pigment concentration: 15% by mass) | | | | | | |
| Resin | Polyester-based urethane resin emulsion 1 (solid concentration: 30% by mass) | 20.0 | 20.0 | 20.0 | 20.0 | 20.0 | 20.0 |
| Organic solvent of General formula (1) | 3-Methoxy-N,N-dimethylpropane amide | 10.0 | 10.0 | 12.0 | 4.0 | | 10.0 |
| | 3-Butoxy-N,N-dimethylpropane amide | | | | | | 10.0 |
| Organic solvent | Propylene glycol | 20.0 | 20.0 | 15.0 | | 15.0 | 15.0 |
| | 1,3-Butanediol | | | | 20.0 | 10.0 | |
| | Ethylene glycol monobutyl ether | | | 5.0 | | | |
| | 2-Ethyl-1,3-hexanediol | 3.0 | | 1.0 | 3.0 | 2.0 | 1.0 |
| | 2,2,4-Trimethyl-1,3-pentanediol | | 2.0 | 1.0 | | 1.0 | |
| Surfactant | SILFACE SAG503A | 1.0 | 1.0 | | 0.8 | 1.0 | 1.0 |
| | UNIDYNE DSN403N | | | 0.5 | | | |
| Water | Ion-exchanged water | Balance | Balance | Balance | Balance | Balance | Balance |
| | Total (% by mass) | 100 | 100 | 100 | 100 | 100 | 100 |

(Nozzle Plate Production Example 1)
<Production of Nozzle Plate A>
<<<Synthesis of Fluorine-Containing Acrylate Ester Polymer A>>>
—Synthesis of Ethylene Oxide Chain-Containing Fluorine Monomer (MPOERfA)—

The reaction formula of the synthesis reaction of an ethylene oxide chain-containing fluorine monomer is presented below.

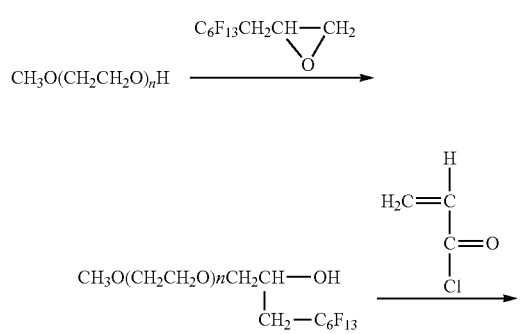

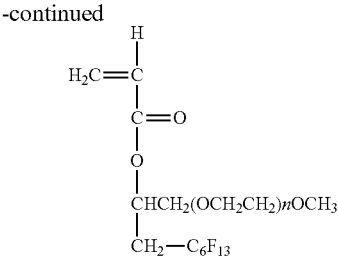

In the reaction formula, the average of n is from 8 through 9.

A four-necked flask was charged with one-terminal methoxy polyethylene glycol (with an average EO number of from 8 through 9, UNIOX M-400, obtained from NOF Corporation) (52.13 g) and a boron trifluoride diethyl ether complex (0.94 g). Under a nitrogen air stream, 3-perfluorohexyl-1,2-epoxy propane (50 g) was dropped into the resultant for from 30 minutes through 40 minutes at room temperature with attention paid to heat generation. After the dropping was completed, the resultant was allowed to continuously react for about 2 hours at room temperature, and then gas chromatography (GC) was performed to confirm that peaks of 3-perfluorohexyl-1,2-epoxy propane had disappeared. Tertiary butyl catechol (0.03 g) was added to the resultant, and the resultant was stirred.

Further, triethyl amine (14.81 g) was added to the resultant, and acrylic acid chloride (12.04 g) was dropped into the resultant for about 20 minutes with attention paid to heat generation. After the dropping was completed, the resultant was allowed to continuously react for about 2 hours at room temperature, and then GC was performed to confirm that peaks of acrylic acid chloride had almost disappeared.

Identification of the product was performed by IR spectrum, $^1$H-NMR spectrum, and $^{19}$F-NMR spectrum.

—Synthesis of Fluorine-Containing Acrylate Ester Polymer A—

A 200 mL four-necked flask was charged with a monomer composition including the synthesized MPOERfA monomer (10% by mass), 2-(perfluorohexyl)ethyl acrylate (60% by mass), polyethylene glycol monoacrylate (EO: 10 moles, obtained from NOF Corporation, AE-400) (20% by mass), 2-hydroxyethyl acrylate (5% by mass), acetoacetoxy ethyl methacrylate, (2.5% by mass), and dimethyl aminoethyl acrylate (2.5% by mass), and isopropyl alcohol (60 g), and blown with nitrogen for 60 minutes to purge the air in the system with nitrogen. With the nitrogen flow continued, the internal temperature was raised to from 75 degrees C. through 80 degrees C., and azobis isobutyronitrile (0.25 g) was added to the resultant, and the resultant was allowed to undergo a polymerization reaction for 8 hours.

The polymerized liquid was analyzed by gas chromatography (GC) and gel permeation chromatography. As a result, it was confirmed that peaks attributable to the monomers had almost disappeared and peaks attributable to a polymer occurred.

The weight average molecular weight of the obtained polymer was 17,000 (polystyrene equivalent).

Finally, acetic acid (0.42 g) was added to the resultant to neutralize the resultant, and the resultant was diluted with water in order to obtain a 20% by mass solution of the fluorine-containing acrylate ester polymer A.

—Production of Nozzle Plate—

Next, a nozzle substrate formed of a stainless steel (SUS304) having a size of 34 mm in length and 16 mm in width and an average thickness of 20 micrometers was prepared.

The nozzle substrate had four nozzle hole lines each including 320 nozzle holes having an average hole diameter of 25 micrometers and a pitch of 85 micrometers (300 dpi) as a minimum center-to-center distance between the nozzle holes.

The produced 20% by mass solution of the fluorine-containing acrylate ester polymer A was applied to the ink discharging-side surface of the nozzle substrate by a dipping method, and dried, to form an ink-repelling film having an average thickness of 50 nm.

In the way described above, a nozzle plate A was produced.

Here, the nozzle holes had been masked with a water-soluble resin and the back surface of the nozzle substrate had been masked with a tape, in order to peel and remove the ink-repelling film after it was formed. Further, the resultant was heated at 120 degrees C. for 1 hour, to form the ink-repelling film.

(Nozzle Plate Production Example 2)

<Production of Nozzle Plate B>

<<Synthesis of Fluorine-Containing Acrylate Ester Polymer B>>

—Synthesis of Rf Epoxy Adduct (FAGMA) of 2-Hydroxyethyl Acrylate (HEA)—

The reaction formula of the synthesis reaction of the Rf epoxy adduct of 2-hydroxyethyl acrylate is presented below.

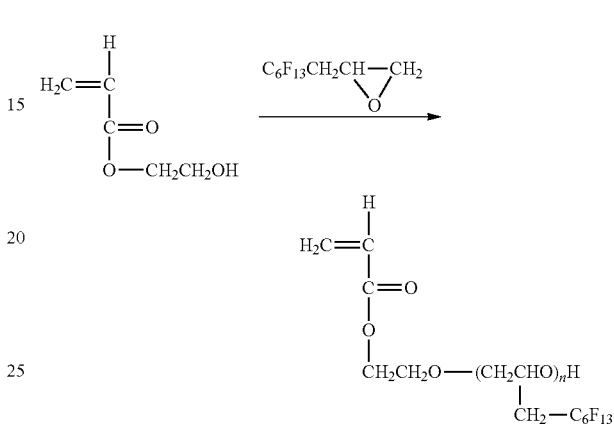

In the reaction formula, n is from 1 through 3.

A four-necked flask was charged with 2-hydroxyethyl acrylate (HEA) (20 g), a boron trifluoride diethyl ether complex (0.61 g), and tertiary butyl catechol (0.026 g). 3-Perfluorohexyl-1,2-epoxy propane (64.83 g) was dropped into the resultant for from 30 minutes through 40 minutes at room temperature with attention paid to heat generation.

After the dropping was completed, the resultant was allowed to continuously react for about 2 hours at room temperature, and then gas chromatography (GC) was performed to confirm that peaks of 3-perfluorohexyl-1,2-epoxy propane had disappeared.

After the reaction ended, the reaction product was dissolved in 1,1-dichloro-1,2,2,3,3-pentafluoropropane (HCFC225) (100 g), and water (100 g) was further added to the resultant. The resultant was washed through a separatory funnel for liquid separation, to extract an organic layer.

This washing and liquid separation operation was repeated once again to extract an organic layer. Magnesium sulfate anhydrous (5 g) was added to the resultant to dry the resultant overnight.

HCFC225 was evaporated from the resultant, to obtain an Rf epoxy adduct (FAGMA) of HEA.

Identification of the product was performed by IR spectrum, $^1$H-NMR, and $^{19}$F-NMR spectrum.

The analysis of the product revealed that a mixture monomer of a 1 mole adduct (n=1) of 3-perfluorohexyl-1,2-epoxy propane (about 64% by mass), a 2 mole adduct (n=2) thereof (about 27% by mass), and a 3 mole adduct thereof (about 9% by mass) was obtained.

—Synthesis of Sulfonic Acid-Containing Fluorine Monomer—

The reaction formula of the synthesis reaction of a sulfonic acid-containing fluorine monomer is presented below.

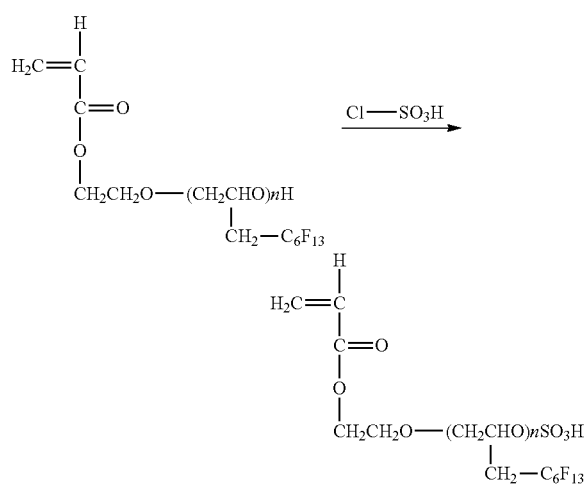

In the reaction formula, n is from 1 through 3.

A four-necked flask was charged with the synthesized Rf epoxy adduct (FAGMA) of HEA (30 g), dichloromethane (30 g), triethyl amine (7.8 g), and hydroquinone monomethyl ether (0.024 g). This mixture solution was cooled to from 0 degrees C. through 10 degrees C. in an ice bath. A chlorosulfonic acid dichloromethane solution (chlorosulfonic acid (7.48 g)+dichloromethane (15 g)) was gradually dropped into the resultant for about 30 minutes with attention paid to heat generation. After the dropping was completed, the resultant was allowed to react at room temperature of 3 hours. Water (100 g) was added to the reaction product, and a washing and liquid separation operation was repeated twice. An organic layer was extracted, and magnesium sulfate anhydrous (5 g) was added to the resultant to dry the resultant overnight.

Identification of the product (sulfonic acid-containing fluorine monomer) was performed by IR spectrum, $^1$H-NMR, and $^{19}$F-NMR spectrum.

—Synthesis of Fluorine-Containing Acrylate Ester Polymer B—

A fluorine-containing acrylate ester polymer B was synthesized in the same manner as in Nozzle plate production example 1, except that unlike in Nozzle plate production example 1, the monomer composition was changed to a combination of 2-(perfluorohexyl)ethyl acrylate (60% by mass), the sulfonic acid-containing fluorine monomer (20% by mass), polyethylene glycol monoacrylate (EO: 10 moles, obtained from NOF Corporation, AE-400) (17.5% by mass), and acetoacetoxy ethyl methacrylate, (2.5% by mass).

The weight average molecular weight of the obtained polymer was 17,000 (polystyrene equivalent).

Finally, acetic acid (0.42 g) was added to the resultant to neutralize the resultant, and the resultant was diluted with water in order to obtain a 20% by mass solution of the fluorine-containing acrylate ester polymer B.

—Production of Nozzle Plate—

The produced 20% by mass solution of the fluorine-containing acrylate ester polymer B was applied to the ink discharging-side surface of the same nozzle substrate as used in Nozzle plate production example 1 by a dipping method, and dried, to form an ink-repelling film having an average thickness of 30 nm. In the way described above, a nozzle plate B was produced.

Here, the nozzle holes had been masked with a water-soluble resin and the back surface of the nozzle substrate had been masked with a tape, in order to peel and remove the ink-repelling film after it was formed. Further, the resultant was heated at 120 degrees C. for 1 hour, to form the ink-repelling film.

(Nozzle Plate Production Example 3)
<Production of Nozzle Plate C>

A fluorine-containing acrylate ester polymer solution (OPTOOL DSX, obtained from DAIKIN INDUSTRIES, LTD.) was prepared.

The fluorine-containing acrylate ester polymer solution (OPTOOL DSX, obtained from DAIKIN INDUSTRIES, LTD.) was applied to the ink discharging-side surface of the same nozzle substrate as used in Nozzle plate production example 1 by a dipping method, and dried, to form an ink-repelling film having an average thickness of 20 nm. In the way described above, a nozzle plate C was produced.

Here, the nozzle holes had been masked with a water-soluble resin and the back surface of the nozzle substrate had been masked with a tape, in order to peel and remove the ink-repelling film after it was formed.

Further, the resultant was heated at 120 degrees C. for 1 hour, to form the ink-repelling film.

(Nozzle Plate Production Example 4)
<Production of Nozzle Plate D>

A silicone resin solution (SR 2441 RESIN, obtained from Dow Corning Toray Co., Ltd.) was prepared.

The silicone resin solution was applied to the ink discharging-side surface of the same nozzle substrate as used in Nozzle plate production example 1 by a dipping method, and dried, to form an ink-repelling film having an average thickness of 100 nm. In the way described above, a nozzle plate D was produced.

Here, the nozzle holes had been masked with a water-soluble resin and the back surface of the nozzle substrate had been masked with a tape, in order to peel and remove the ink-repelling film after it was formed.

The resultant was heated and cured in the atmospheric environment at 150 degrees C. for 2 hours, to form the ink-repelling film.

Examples 1 to 8 and Comparative Examples 1 and 2

<Image Formation>

The head of an inkjet printer (GXE5500, obtained from Ricoh Company, Ltd.) was mounted with the produced nozzle plates A to D as presented in Table 7 and Table 8. Ink cartridges were filled with the inks of the ink sets of Examples 1 to 8 and Comparative Examples 1 and 2 presented in Table 7 and Table 8. The remodeled inkjet printer GXE5500 was mounted with the ink cartridges filled with the inks, to perform inkjet printing.

Solid images having a 100% gradation level and halftone images having a 30% gradation level were printed at a resolution of 600×600 dpi with an ink volume of 21 pL per ink droplet. Subsequently, the printed matters were dried in a hot air drying oven at 70 degrees C. for 3 minutes, for fixing.

PVC (product name: GIY-11Z5, obtained from Lintec Corporation) was used as the print medium.

Next, various properties were evaluated in the manners described below. The results are presented in Table 7 and Table 8.

<Image Density>

The solid images of the standard inks (black, cyan, yellow, and magenta) were subjected to colorimetry with X-RITE EXACT (obtained from X-Rite Inc.), and evaluated according to the criteria described below. The ratings B and A are desirable for practical use.

[Evaluation Criteria]
—Black—
A: 2.0 or higher
B: 1.8 or higher but lower than 2.0
C: 1.6 or higher but lower than 1.8
D: Lower than 1.6
—Cyan—
A: 1.6 or higher
B: 1.5 or higher but lower than 1.6
C: 1.4 or higher but lower than 1.5
D: Lower than 1.4
—Magenta—
A: 1.2 or higher
B: 1.1 or higher but lower than 1.2
C: 1.0 or higher but lower than 1.1
D: Lower than 1.0
—Yellow—
A: 1.0 or higher
B: 0.9 or higher but lower than 1.0
C: 0.8 or higher but lower than 0.9
D: Lower than 0.8

<Graininess>

The graininess of the halftone images of the light inks (light cyan and light magenta) was measured with PIAS-II (obtained from Trek Japan Corporation), and evaluated according to the criteria described below. The ratings B and A are desirable for practical use. Evaluation results of the graininess of the halftone images of the standard inks (cyan and magenta) are presented in Tables 7 and 8 as reference values.

[Evaluation Criteria]
A: Lower than 2.0
B: 2.0 or higher but lower than 4.0
C: 4.0 or higher but lower than 6.0
D: 6.0 or higher <Fixability>

The solid images were subjected to a cross-cut peel test using a cloth adhesive tape (obtained from Nichiban Co., Ltd. 123LW-50), and the number of remaining squares among a hundred test squares was counted, to evaluate fixability on the print medium according to the evaluation criteria described below. The ratings B and A are desirable for practical use.

[Evaluation Criteria]
A: The number of remaining squares was 90 or greater.
B: The number of remaining squares was 70 or greater but less than 90.
C: The number of remaining squares was less than 70.

<Receding Contact Angle>

Each ink (2.0 microliters) was pushed out from a syringe mounted with a syringe needle having an inner diameter of 0.37 micrometers and a length of 0.18 mm onto the surfaces of the nozzle plates produced above, i.e., onto the ink-repelling films serving as the surfaces facing the print medium in an environment at 25 degrees C., to measure the receding contact angle (degree) at 25 degrees C. with an automatic contact angle meter DMO-501 (obtained from Kyowa Interface Science Co., Ltd.) by a contraction method.

<Evaluation of Continuous Discharging>

Each prepared ink (1 L) was passed from the ink cartridge of the inkjet printer (IPSIO GXE-5500, obtained from Ricoh Company, Ltd.) to the discharging head for each color. Immediately subsequently, a chart generated with MICROSOFT WORD 2000 and including a solidly painted solid image occupying 80% of the area of a A4-size sheet was printed out on 200 sheets of MYPAPER (obtained from Ricoh Company, Ltd.) continuously. After the chart was printed out, a nozzle check chart was printed out, to evaluate discharging disorder of each nozzle according to the evaluation criteria described below.

As the printing mode, a "plain paper-standardly fast" mode modified to "without color correction" from user settings for plain paper, using a driver provided as an attachment of the printer, was used.

[Evaluation Criteria]
A: There was no discharging disorder.
B: There was a slight discharging disorder.
C: There was discharging disorder, or some nozzles failed to discharge.
D: There was a severe discharging disorder, or many nozzles failed to discharge.

TABLE 7

| | | | | | Evaluation results | | | | |
|---|---|---|---|---|---|---|---|---|---|
| | | | | | | Solid image | | Halftone image Graininess, | Evaluation of |
| | | Pigment | | Receding | | | | | |
| | Ink set | concentration (% by mass) | Nozzle plate | contact angle [degree] | Image density | Fixability | | Reference value in parentheses | continuous discharging |
| Ex. 1 | Black ink A | 2.7 | Nozzle | 68 | A | A | | — | A |
| | Cyan ink A | 2.5 | plate | 67 | A | A | | (D) | A |
| | Magenta ink A | 2.5 | A | 70 | A | A | | (D) | A |
| | Yellow ink A | 2.7 | | 66 | A | A | | — | A |
| | Light cyan ink A | 0.9 | | 68 | — | A | | A | A |
| | Light magenta ink A | 1.1 | | 68 | — | A | | A | A |
| Ex. 2 | Black ink A | 2.7 | Nozzle | 70 | A | A | | — | A |
| | Cyan ink B | 2.1 | plate | 66 | B | A | | (D) | A |
| | Magenta ink B | 2.1 | B | 71 | B | A | | (D) | A |
| | Yellow ink A | 2.7 | | 68 | A | A | | — | A |
| | Light cyan ink A | 0.9 | | 68 | — | A | | A | A |
| | Light magenta ink B | 0.9 | | 69 | — | A | | A | A |
| Ex. 3 | Black ink A | 2.7 | Nozzle | 72 | A | A | | — | A |
| | Cyan ink C | 3.5 | plate | 68 | A | A | | (D) | B |
| | Magenta ink C | 3.5 | C | 69 | A | A | | (D) | B |
| | Yellow ink A | 2.7 | | 68 | A | A | | — | A |
| | Light cyan ink A | 0.9 | | 66 | — | A | | A | A |
| | Light magenta ink A | 1.1 | | 67 | — | A | | A | A |

TABLE 7-continued

| | Ink set | Pigment concentration (% by mass) | Nozzle plate | Receding contact angle [degree] | Solid image Image density | Solid image Fixability | Halftone image Graininess, Reference value in parentheses | Evaluation of continuous discharging |
|---|---|---|---|---|---|---|---|---|
| Ex. 4 | Black ink A | 2.7 | Nozzle plate D | 38 | A | A | — | B |
| | Cyan ink A | 2.5 | | 41 | A | A | (D) | B |
| | Magenta ink A | 2.5 | | 39 | A | A | (D) | B |
| | Yellow ink A | 2.7 | | 38 | A | A | — | B |
| | Light cyan ink A | 0.9 | | 40 | — | A | A | B |
| | Light magenta ink A | 1.1 | | 37 | — | A | A | B |
| Ex. 5 | Black ink B | 2.7 | Nozzle plate B | 31 | A | A | — | B |
| | Cyan ink D | 2.6 | | 30 | A | A | (D) | B |
| | Magenta ink D | 2.6 | | 31 | A | A | (D) | B |
| | Yellow ink B | 2.7 | | 29 | A | A | — | B |
| | Light cyan ink B | 0.6 | | 32 | — | A | B | B |
| | Light magenta ink C | 0.7 | | 20 | — | A | B | B |
| Ex. 6 | Black ink A | 2.7 | Nozzle plate B | 70 | A | A | — | A |
| | Cyan ink A | 2.5 | | 66 | A | A | (D) | A |
| | Magenta ink A | 2.5 | | 71 | A | A | (D) | A |
| | Yellow ink A | 2.7 | | 68 | A | A | — | A |
| | Light cyan ink C | 0.7 | | 72 | — | B | A | A |
| | Light magenta ink D | 0.9 | | 67 | — | B | A | A |
| Ex. 7 | Black ink A | 2.7 | Nozzle plate A | 68 | A | A | — | A |
| | Cyan ink G | 2.4 | | 69 | A | A | (D) | A |
| | Magenta ink G | 2.4 | | 71 | A | A | (D) | A |
| | Yellow ink A | 2.7 | | 66 | A | A | — | A |
| | Light cyan ink E | 0.9 | | 69 | — | A | A | A |
| | Light magenta ink A | 1.1 | | 68 | — | A | A | A |
| Ex. 8 | Black ink A | 2.7 | Nozzle plate A | 68 | A | A | — | A |
| | Cyan ink H | 3.0 | | 72 | A | A | (D) | A |
| | Magenta ink H | 3.0 | | 67 | A | A | (D) | A |
| | Yellow ink A | 2.7 | | 66 | A | A | — | A |
| | Light cyan ink A | 0.9 | | 68 | — | A | A | A |
| | Light magenta ink F | 0.9 | | 68 | — | A | A | A |

TABLE 8

| | Ink set | Pigment concentration (% by mass) | Nozzle plate | Receding contact angle [degree] | Solid image Image density | Solid image Fixability | Halftone image Graininess, Reference value in parentheses | Evaluation of continuous discharging |
|---|---|---|---|---|---|---|---|---|
| Comp. Ex. 1 | Black ink C | 2.7 | Nozzle plate B | 70 | B | C | — | A |
| | Cyan ink E | 2.5 | | 66 | B | C | (D) | A |
| | Magenta ink E | 2.5 | | 71 | B | C | (D) | A |
| | Yellow ink C | 2.7 | | 68 | B | C | — | A |
| | Light cyan ink D | 0.9 | | 66 | — | C | B | A |
| | Light magenta ink E | 1.1 | | 68 | — | C | B | A |
| Comp. Ex. 2 | Black ink A | 2.7 | Nozzle plate B | 70 | A | A | — | A |
| | Cyan ink F | 1.5 | | 69 | C | A | (B) | A |
| | Magenta ink F | 1.5 | | 71 | C | A | (B) | A |
| | Yellow ink A | 2.7 | | 68 | A | A | — | A |
| | Light cyan ink A | 0.6 | | 68 | — | A | A | A |
| | Light magenta ink A | 0.7 | | 69 | — | A | A | A |

Aspects of the present disclosure are, for example, as follows.

<1> An ink set including:
a standard ink; and
a light ink,
wherein the standard ink includes at least a cyan ink, a magenta ink, and a yellow ink,
the light ink includes a light cyan ink or a light magenta ink, or both,
a content of a cyan pigment in the cyan ink is 1.9% by mass or greater but 3.6% by mass or less,
a content of a cyan pigment in the light cyan ink is 0.4% by mass or greater but 1.4% by mass or less,
a content of a magenta pigment in the magenta ink is 1.9% by mass or greater but 3.6% by mass or less,
a content of a magenta pigment in the light magenta ink is 0.4% by mass or greater but 1.4% by mass or less,
the light ink contains water, an organic solvent, and a resin, and
the organic solvent contains an amide compound represented by General formula (1) below, General formula (1)

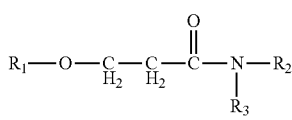

where in the General formula (1), $R_1$, $R_2$, and $R_3$ each independently represent a hydrocarbon group containing from 1 through 8 carbon atoms.

<2> The ink set according to <1>,
wherein the light ink contains a surfactant.

<3> An inkjet printing apparatus including:
an ink accommodating unit storing each ink of the ink set according to <1> or <2>; and
a discharging head including a nozzle plate, the discharging head configured to discharge each ink of the ink set,
wherein each ink has a receding contact angle of 35 degrees or greater on the nozzle plate of the discharging head.

<4> The inkjet printing apparatus according to <3>,
wherein the nozzle plate includes an ink-repelling film, and
the ink-repelling film contains a fluorine-containing acrylate ester polymer.

<5> The inkjet printing apparatus according to <4>,
wherein the fluorine-containing acrylate ester polymer contains a polymer obtained by polymerizing either or both of a compound represented by General formula (I) below and a compound represented by General formula (II) below, General formula (I)

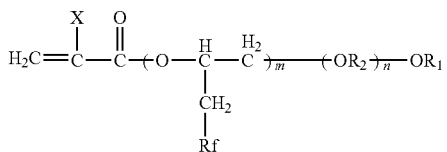

General formula (II)

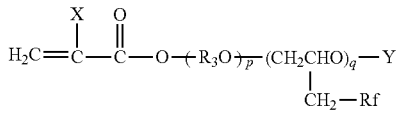

where in the General formulae (I) and (II), X represents a hydrogen atom, a straight-chain or branched alkyl group containing from 1 through 21 carbon atoms, a halogen atom, a $CFX_1X_2$ group where $X_1$ and $X_2$ each independently represent a hydrogen atom or a halogen atom, a cyano group, a straight-chain or branched fluoroalkyl group containing from 1 through 21 carbon atoms, a substituted or unsubstituted benzyl group, or a substituted or unsubstituted phenyl group, $R_1$ represents an alkyl group containing from 1 through 18 carbon atoms, $R_2$ represents an alkylene group containing from 2 through 6 carbon atoms, $R_3$ represents an alkylene group containing from 2 through 6 carbon atoms, Y represents an acid radical, Rf represents a straight-chain or branched fluoroalkyl group containing from 1 through 21 carbon atoms, m is from 1 through 10, n is from 2 through 90, p is from 1 through 90, and q is from 1 through 10.

<6> The inkjet printing apparatus according to <4>,
wherein the fluorine-containing acrylate ester polymer contains a polymer containing either or both of a structural unit represented by General formula (III) below and a structural unit represented by General formula (IV) below, General formula (III)

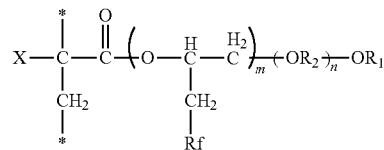

General formula (IV)

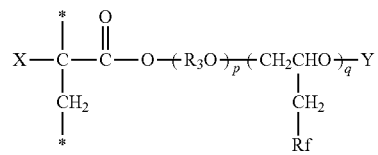

where in the General formulae (III) and (IV), X represents a hydrogen atom, a straight-chain or branched alkyl group containing from 1 through 21 carbon atoms, a halogen atom, a $CFX_1X_2$ group where $X_1$ and $X_2$ each independently represent a hydrogen atom or a halogen atom, a cyano group, a straight-chain or branched fluoroalkyl group containing from 1 through 21 carbon atoms, a substituted or unsubstituted benzyl group, or a substituted or unsubstituted phenyl group, $R_1$ represents an alkyl group containing from 1 through 18 carbon atoms, $R_2$ represents an alkylene group containing from 2 through 6 carbon atoms, $R_3$ represents an alkylene group containing from 2 through 6 carbon atoms, Y represents an acid radical, Rf represents a straight-chain or branched fluoroalkyl group containing from 1 through 21 carbon atoms, m is from 1 through 10, n is from 2 through 90, p is from 1 through 90, and q is from 1 through 10.

<7> The inkjet printing apparatus according to any one of <4> to <6>,
wherein the ink-repelling film contains a polymer having a fluorine-containing heterocyclic structure in a main chain thereof.

<8> An inkjet printing method including
discharging each ink of the ink set according to <1> or <2> from a discharging head,
wherein each ink has a receding contact angle of 35 degrees or greater on a nozzle plate of the discharging head.

The ink set according to <1> or <2>, the inkjet printing apparatus according to any one of <3> to <7>, and the inkjet printing method according to <8> can solve the various problems in the related art and achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:
1. An ink set comprising:
a standard ink; and
a light ink,
wherein the standard ink comprises at least a cyan ink, a magenta ink, and a yellow ink,
the light ink comprises a light cyan ink or a light magenta ink, or both, a content of a cyan pigment in the cyan ink is 1.9% by mass or greater but 3.6% by mass or less, a content of a cyan pigment in the light cyan ink is 0.4% by mass or greater but 1.4% by mass or less, a content of a magenta pigment in the magenta ink is 1.9% by mass or greater but 3.6% by mass or less, a content of a magenta pigment in the light magenta ink is 0.4% by mass or greater but 1.4% by mass or less, the light ink contains water, an organic solvent, and a resin, and the organic solvent contains an amide compound represented by General formula (1) below,

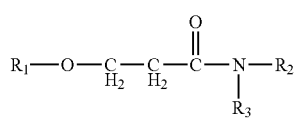

General formula (1)

where in the General formula (1), $R_1$, $R_2$, and $R_3$ each independently represent a hydrocarbon group containing from 1 through 8 carbon atoms.

2. The ink set according to claim 1, wherein the light ink contains a surfactant.

3. An inkjet printing apparatus comprising:
an ink accommodating unit storing each ink of the ink set according to claim 1; and
a discharging head including a nozzle plate, the discharging head configured to discharge each ink of the ink set, wherein each ink has a receding contact angle of 35 degrees or greater on the nozzle plate of the discharging head.

4. The inkjet printing apparatus according to claim 3, wherein the nozzle plate includes an ink-repelling film, and
the ink-repelling film contains a fluorine-containing acrylate ester polymer.

5. The inkjet printing apparatus according to claim 4, wherein the fluorine-containing acrylate ester polymer comprises a polymer obtained by polymerizing either or both of a compound represented by General formula (I) below and a compound represented by General formula (II) below,

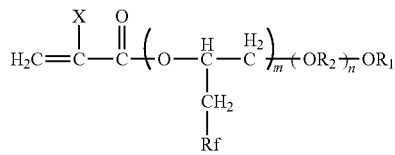

General formula (I)

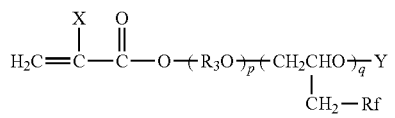

General formula (II)

where in the General formulae (I) and (II), X represents a hydrogen atom, a straight-chain or branched alkyl group containing from 1 through 21 carbon atoms, a halogen atom, a $CFX_1X_2$ group where $X_1$ and $X_2$ each independently represent a hydrogen atom or a halogen atom, a cyano group, a straight-chain or branched fluoroalkyl group containing from 1 through 21 carbon atoms, a substituted or unsubstituted benzyl group, or a substituted or unsubstituted phenyl group, $R_1$ represents an alkyl group containing from 1 through 18 carbon atoms, $R_2$ represents an alkylene group containing from 2 through 6 carbon atoms, $R_3$ represents an alkylene group containing from 2 through 6 carbon atoms, Y represents an acid radical, Rf represents a straight-chain or branched fluoroalkyl group containing from 1 through 21 carbon atoms, m is from 1 through 10, n is from 2 through 90, p is from 1 through 90, and q is from 1 through 10.

6. The inkjet printing apparatus according to claim 4, wherein the fluorine-containing acrylate ester polymer comprises a polymer containing either or both of a structural unit represented by General formula (III) below and a structural unit represented by General formula (IV) below,

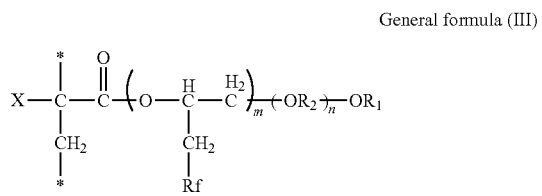

General formula (III)

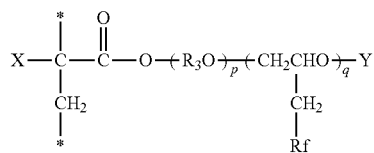

General formula (IV)

where in the General formulae (III) and (IV), X represents a hydrogen atom, a straight-chain or branched alkyl group containing from 1 through 21 carbon atoms, a halogen atom, a $CFX_1X_2$ group where $X_1$ and $X_2$ each independently represent a hydrogen atom or a halogen atom, a cyano group, a straight-chain or branched fluoroalkyl group containing from 1 through 21 carbon atoms, a substituted or unsubstituted benzyl group, or a substituted or unsubstituted phenyl group, $R_1$ represents an alkyl group containing from 1 through 18 carbon atoms, $R_2$ represents an alkylene group containing from 2 through 6 carbon atoms, $R_3$ represents an alkylene group containing from 2 through 6 carbon atoms, Y represents an acid radical, Rf represents a straight-chain or branched fluoroalkyl group containing from 1 through 21 carbon atoms, m is from 1 through 10, n is from 2 through 90, p is from 1 through 90, and q is from 1 through 10.

7. The inkjet printing apparatus according to claim 4, wherein the ink-repelling film contains a polymer having a fluorine-containing heterocyclic structure in a main chain thereof.

8. An inkjet printing method comprising
discharging each ink of the ink set according to claim 1 from a discharging head,
wherein each ink has a receding contact angle of 35 degrees or greater on a nozzle plate of the discharging head.

* * * * *